United States Patent
Kuchi et al.

(10) Patent No.: US 11,985,017 B2
(45) Date of Patent: May 14, 2024

(54) METHOD AND SYSTEM FOR GENERATING A TRANSMIT WAVEFORM FOR REFERENCE SEQUENCES

(71) Applicants: INDIAN INSTITUTE OF TECHNOLOGY HYDERABAD, Sangareddy (IN); WISIG NETWORKS PRIVATE LIMITED, Hyderabad (IN)

(72) Inventors: Kiran Kumar Kuchi, Hyderabad (IN); Saidhiraj Amuru, Hyderabad (IN); Sibgath Ali Khan Makandar, Sangareddy (IN)

(73) Assignees: INDIAN INSTITUTE OF TECHNOLOGY HYDERABAD (IITH) (IN); WISIG NETWORKS PRIVATE LIMITED (IN)

( * ) Notice: Subject to any disclaimer, the term of this patent is extended or adjusted under 35 U.S.C. 154(b) by 365 days.

(21) Appl. No.: 17/284,050

(22) PCT Filed: Oct. 28, 2019

(86) PCT No.: PCT/IN2019/050792
§ 371 (c)(1),
(2) Date: Apr. 9, 2021

(87) PCT Pub. No.: WO2020/089931
PCT Pub. Date: May 7, 2020

(65) Prior Publication Data
US 2022/0038319 A1    Feb. 3, 2022

(30) Foreign Application Priority Data

Oct. 28, 2018  (IN) .............................. 201841040625
Nov. 2, 2018   (IN) .............................. 201841041687

(Continued)

(51) Int. Cl.
H04L 27/26    (2006.01)
H04J 13/00    (2011.01)
H04L 5/00     (2006.01)

(52) U.S. Cl.
CPC ...... *H04L 27/2613* (2013.01); *H04J 13/0062* (2013.01); *H04L 5/0051* (2013.01);
(Continued)

(58) Field of Classification Search
None
See application file for complete search history.

(56) References Cited

U.S. PATENT DOCUMENTS 7,746,916 B2    6/2010  Han et al.
2006/0256881 A1  11/2006  Yonge et al.
(Continued)

FOREIGN PATENT DOCUMENTS

DE  202006021313   10/2015
WO  2017178871     10/2017

OTHER PUBLICATIONS

Int'l Search Report and Written Opinion Appln No. PCT/IN2019/0050792 dated Feb. 12, 2020.

*Primary Examiner* — Adnan Baig
(74) *Attorney, Agent, or Firm* — McAndrews, Held & Malloy, Ltd.

(57) ABSTRACT

Embodiments of the present disclosure relate to a method and system to selecting a waveform in a communication network. The method comprises selecting at least one sequence from a plurality of sequences for transmitting, said plurality of sequences comprises a plurality of sub-set of sequences such that a sequence in a sub-set of sequences is a cyclic shifted version another sequence in said sub-set of sequences. Also, the method comprises rotating at least one sequence from a plurality of sequences by 90 degrees to (Continued)

produce at least one rotated sequence. Further, the method comprises transforming the at least one rotated sequence into frequency domain using a Discrete Fourier Transform (DFT) to generate a transformed sequence and mapping the transformed sequence using a plurality of subcarriers to generate a mapped sequence. Thereafter, the method comprises processing the mapped sequence to generate a waveform having an optimized PAPR, optimized auto and cross-correlation.

20 Claims, 14 Drawing Sheets

(30)      Foreign Application Priority Data

Nov. 10, 2018    (IN)  ............................. 201841042311
Nov. 16, 2018    (IN)  ............................. 201841043112

(52) U.S. Cl.
     CPC ...... *H04L 27/2614* (2013.01); *H04L 27/2636* (2013.01); *H04L 27/26134* (2021.01)

(56) References Cited

U.S. PATENT DOCUMENTS

| | | | |
|---|---|---|---|
| 2008/0165903 A1* | 7/2008 | Hooli | H04B 1/70753 375/E1.012 |
| 2008/0304548 A1* | 12/2008 | Duverdier | H04B 1/69 375/140 |
| 2012/0170678 A1* | 7/2012 | Krachkovsky | H03M 13/256 375/295 |
| 2013/0064227 A1* | 3/2013 | Iwai | H04L 5/0048 370/335 |
| 2013/0176987 A1* | 7/2013 | Kawamura | H04L 5/0051 370/330 |
| 2018/0076917 A1* | 3/2018 | Pan | H04L 27/2602 |
| 2018/0212809 A1* | 7/2018 | Bakulin | H04B 7/0465 |
| 2018/0324678 A1* | 11/2018 | Chen | H04W 56/001 |
| 2019/0036746 A1* | 1/2019 | Hwang | H04L 27/2607 |
| 2019/0097853 A1* | 3/2019 | Suzuki | H04L 27/26 |
| 2019/0364603 A1* | 11/2019 | Qian | H04J 13/004 |
| 2020/0127795 A1* | 4/2020 | Matsumura | H04L 1/1692 |

* cited by examiner

RS may be ZC in one embodiment

| DMRS | DATA / DMRS | DATA / DMRS | DATA / DMRS | ............... | DATA / DMRS |

METHOD AND SYSTEM FOR GENERATING A TRANSMIT WAVEFORM FOR REFERENCE SEQUENCES

CROSS-REFERENCE TO RELATED APPLICATIONS

The present application is a national stage application under 35 U.S.C. § 371 of application Serial No. PCT/IN2019/050792, filed on Oct. 28, 2019, and entitled "METHOD AND SYSTEM FOR GENERATING A TRANSMIT WAVEFORM FOR REFERENCE SEQUENCES", which claims priority to Indian Patent Application No. 201841040625, filed Oct. 28, 2018, Indian Patent Application No. 201841041687, filed Nov. 2, 2018, Indian Patent Application No. 201841042311, filed Nov. 10, 2018, Indian Patent Application No. 201841043112, filed Nov. 16, 2018 of which are hereby incorporated by reference in their entireties. The aforementioned application is hereby incorporated herein by reference in its entirety.

TECHNICAL FIELD

Embodiments of the present disclosure are related, in general to communication, but exclusively relate to method and system for generating a waveform with low peak-to-average power ratio (PAPR), low auto-correlation, low cross-correlation and good spectrum flatness properties.

BACKGROUND

Presently, 5G new radio (NR) supports enhanced mobile broadband (eMBB), ultra-reliable-low-latency-communication (URLLC) and massive-machine-type-communication (mMTC) for frequency bands below 6 GHz, as well as above 6 GHz, including millimeter wave bands i.e. 20-40 GHz and 20-30 GHz.

For ultra-low latency, a communication system requires uplink control information such as hybrid automatic repeat request (ARQ) ACK/NACK, for at least one of successful decoding of block through 1-bit ACK/NACK commands, and uplink sounding reference signal (SRS) to be sent to the base station with very low delay. Other control information comprises channel quality indicator (CQI), MIMO rank and other information.

As per the specifications, 5G requires a method of multiplexing control, data, and SRS signals using certain waveform. The 5G NR supports both Discrete Fourier Transform-spread-Orthogonal frequency-division multiplexing (DFT-s-OFDM) based waveform and Orthogonal frequency-division multiplexing (OFDM) waveform for uplink. In the uplink transmission, multiple users can simultaneously transmit control information in the same time frequency resources. The users may be multiplexed in time, frequency or code domain. The user control information (UCI) may be 1 or 2 bits for the case of HARQ ACK/NACK, Scheduling Request (SR) etc., or more than 2 bits for the case of CQI, MIMO rank or other information. Generally, the control channel that carries 1- or 2-bits UCI is called short Physical Uplink Control Channel (PUCCH) and the one that carries more than 2 bits UCI is called long PUCCH. Similarly, the reference signals (RS) which are used for channel estimation may be multiplexed in time, frequency or code domain. Existing methods do not facilitate generation of a waveform that can transmit the signal at or near PA saturation power level. Therefore, there exists a need for a method of transmitting a waveform with low PAPR, so that the power amplifier (PA) can transmit at maximum available power and that the waveform preferably supports transmission of multiple users in the same time frequency resources.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In one aspect of the present disclosure a method of generating a waveform in a communication network is disclosed. The method comprises selecting, by a transmitter, at least one sequence from a plurality of sequences based on an indication by a base station (BS) to a user equipment (UE), said plurality of sequences comprises a plurality of sub-set of sequences such that a sequence in a sub-set of sequences is a cyclic shifted version of another sequence in the said sub-set of sequences. Also, the method comprises rotating the successive samples of at least one sequence from a plurality of sequences by 90 degrees to produce at least one rotated sequence. Further, the method comprises transforming the at least one rotated sequence into frequency domain using a Discrete Fourier Transform (DFT) to generate a transformed sequence and mapping the transformed sequence using a plurality of subcarriers to generate a mapped transformed sequence. Thereafter, the method comprises processing the mapped transformed sequence to generate a waveform having an optimized PAPR, optimized auto and cross-correlation.

In another aspect of the present disclosure a transmitter for generating a waveform in a communication system is disclosed. The system comprises a processor, and a memory communicatively coupled to the processor. The processor is configured to select at least one sequence from a plurality of sequences based on an indication by a base station (BS) to a user equipment (UE), said plurality of sequences comprises a plurality of sub-set of sequences such that a sequence in a sub-set of sequences is a cyclic shifted version of another sequence in the said sub-set of sequences, rotate successive samples of the at least one sequence from a plurality of sequences by 90 degrees to produce at least one rotated sequence, transform the at least one rotated sequence into frequency domain using a Discrete Fourier Transform (DFT) to generate a transformed sequence, map the transformed sequence using a plurality of subcarriers to generate a mapped transformed sequence and process the mapped transformed sequence to generate a waveform having an optimized PAPR, optimized auto and cross-correlation.

In yet another aspect of the present disclosure a method of generating a waveform in a communication network is disclosed. The method comprises selecting, by a transmitter, at least one sequence from a plurality of sequences based on an indication by a base station (BS) to a user equipment (UE), said plurality of sequences comprises a plurality of sub-set of sequences such that a sequence in a sub-set of sequences is a cyclic shifted version of another sequence in the said sub-set of sequences. Also, the method comprises rotating the successive samples of at least one sequence from a plurality of sequences by 90 degrees to produce at least one rotated sequence. Further, the method comprises transforming the at least one rotated sequence into frequency domain using a Discrete Fourier Transform (DFT) to generate a transformed sequence. Furthermore, the method comprises mapping the transformed sequence using a plurality of subcarriers to generate a mapped transformed sequence, said the mapped transformed sequence includes 'P' zeros between any two consecutive samples of a mapped transformed sequence, said P is an integer. Thereafter, the method comprises processing the mapped transformed sequence to generate a waveform having an optimized PAPR, optimized auto and cross-correlation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

Figure 17:
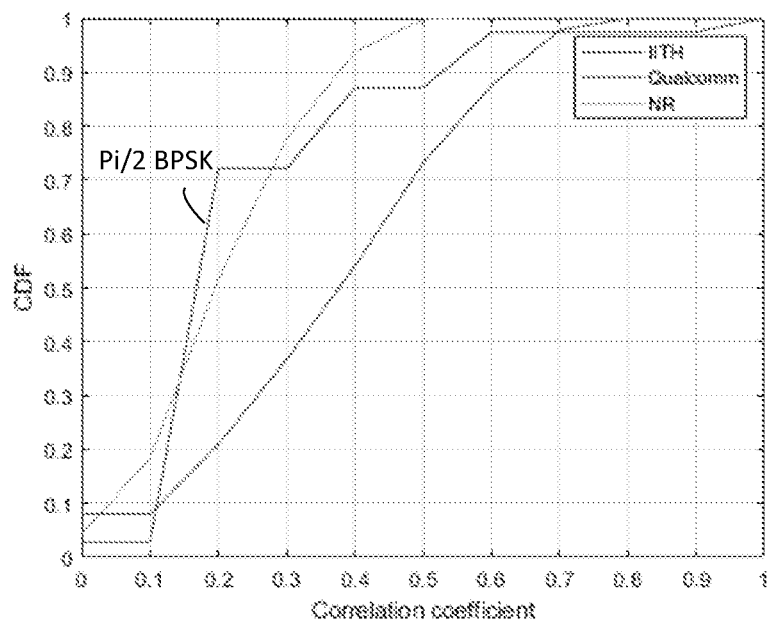
Figure 18:
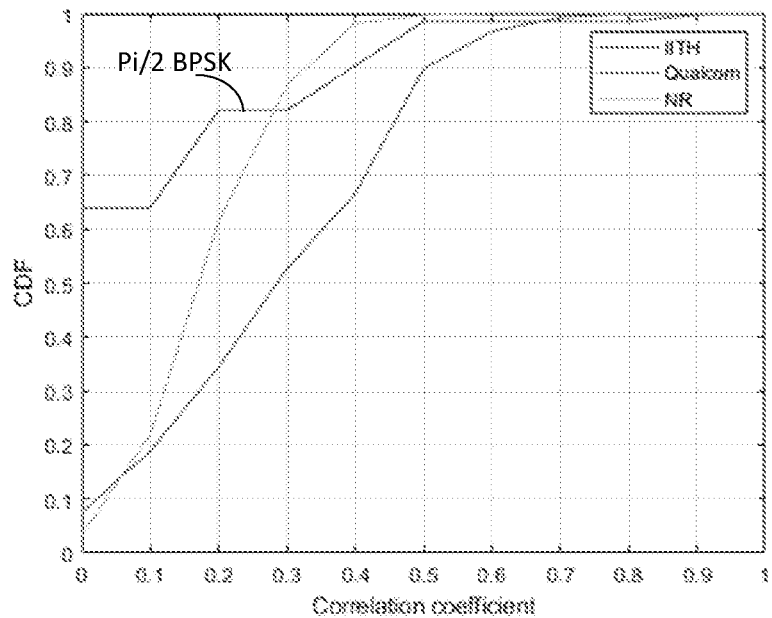
Figure 19:
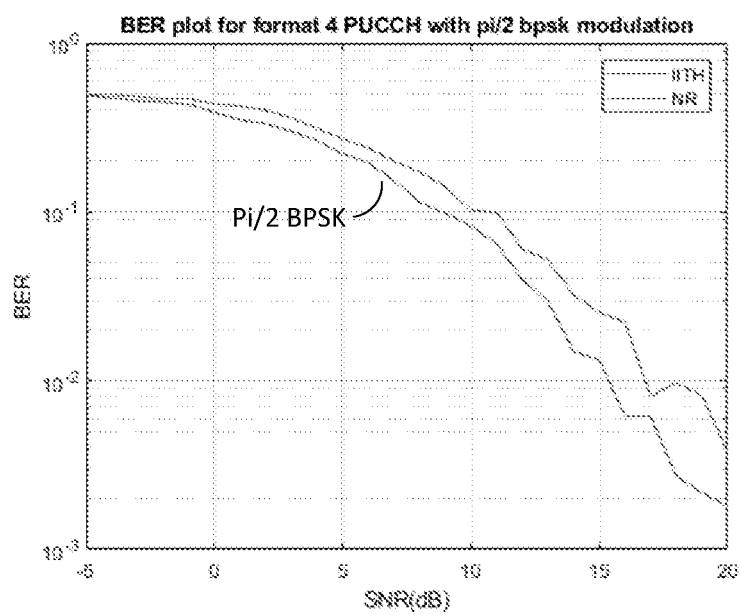

FIGS. 15 to 18 show the comparison of cross correlation performance of the proposed sequences across all the 30 base sequences with that of 30 QPSK based sequences and the sequences, in accordance with an embodiment of the present disclosure; and FIG. 19 shows a plot illustrating BER performance for PUCCH format-4 with pi/2 BPSK modulation, in accordance with an embodiment of the present disclosure.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

Embodiments of the present disclosure relate to a method and system to generate a waveform in a communication network. The method comprises selecting, by a transmitter, at least one sequence from a plurality of sequences based on an indication by a base station (BS) to a user equipment (UE), said plurality of sequences comprises a plurality of sub-set of sequences such that a sequence in a sub-set of sequences is a cyclic shifted version of another sequence in the said sub-set of sequences. Also, the method comprises rotating the successive samples of at least one sequence from a plurality of sequences by 90 degrees to produce at least one rotated sequence. Further, the method comprises transforming the at least one rotated sequence into frequency domain using a Discrete Fourier Transform (DFT) to generate a transformed sequence and mapping the transformed sequence using a plurality of subcarriers to generate a mapped transformed sequence. Thereafter, the method comprises processing the mapped transformed sequence to generate a waveform having an optimized PAPR, optimized auto and cross-correlation.

In another aspect of the present disclosure a transmitter for generating a waveform in a communication system is disclosed. The system comprises a processor, and a memory communicatively coupled to the processor. The processor is configured to select at least one sequence from a plurality of sequences based on an indication by a base station (BS) to a user equipment (UE), said plurality of sequences comprises a plurality of sub-set of sequences such that a sequence in a sub-set of sequences is a cyclic shifted version of another sequence in the said sub-set of sequences, rotate successive samples of the at least one sequence from a plurality of sequences by 90 degrees to produce at least one rotated sequence, transform the at least one rotated sequence into frequency domain using a Discrete Fourier Transform (DFT) to generate a transformed sequence, map the transformed sequence using a plurality of subcarriers to generate a mapped transformed sequence and process the mapped transformed sequence to generate a waveform having an optimized PAPR, optimized auto and cross-correlation.

In yet another aspect of the present disclosure a method of generating a waveform in a communication network is disclosed. The method comprises selecting, by a transmitter, at least one sequence from a plurality of sequences based on an indication by a base station (BS) to a user equipment (UE), said plurality of sequences comprises a plurality of sub-set of sequences such that a sequence in a sub-set of sequences is a cyclic shifted version of another sequence in the said sub-set of sequences. Also, the method comprises rotating the successive samples of at least one sequence from a plurality of sequences by 90 degrees to produce at least one rotated sequence. Further, the method comprises transforming the at least one rotated sequence into frequency domain using a Discrete Fourier Transform (DFT) to generate a transformed sequence. Furthermore, the method comprises mapping the transformed sequence using a plurality of subcarriers to generate a mapped transformed sequence, said the mapped transformed sequence includes 'P' zeros between any two consecutive samples of a mapped transformed sequence, said P is an integer. Thereafter, the method comprises processing the mapped transformed sequence to generate a waveform having an optimized PAPR, optimized auto and cross-correlation.

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

Figure 1A:
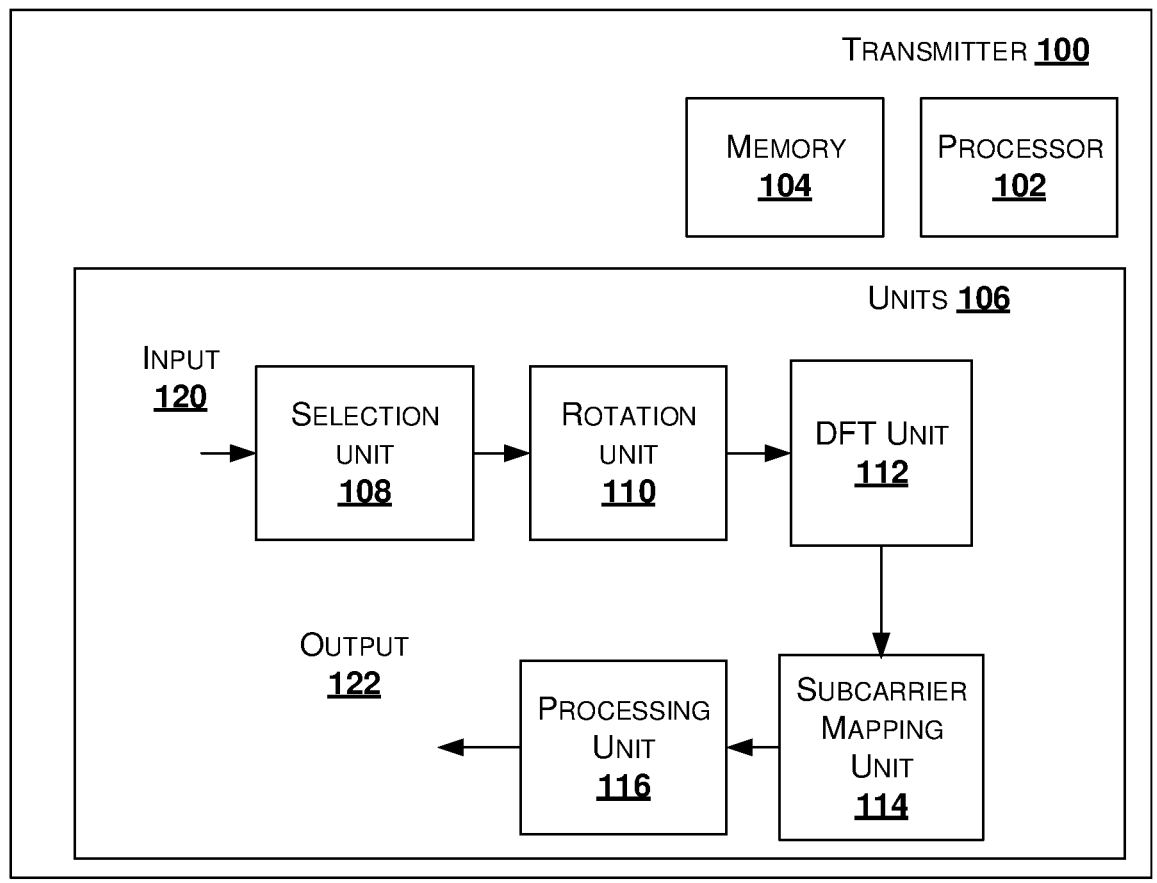
FIG. 1A shows an exemplary block diagram of a transmitter for generating a waveform in a communication network, in accordance with an embodiment of the present disclosure.

FIG. 1A shows a block diagram of a transmitter for generating waveform in a communication network, in accordance with an embodiment of the present disclosure.

As shown in FIG. 1A, the transmitter 100 comprises a processor 102, and memory 104 coupled with the processor 102. The transmitter 100 is also referred as a communication system or user equipment (UE) transmitter. The processor 102 may be configured to perform one or more functions of the communication system 100 to generate waveform for transmitting to a receiver. In one implementation, the transmitter 100 may comprise units or blocks 106, also referred as modules, for performing various operations in accordance with the embodiments of the present disclosure.

The units 106 includes a selection unit 108, rotation unit 110, a discrete Fourier transform (DFT) 112, a subcarrier mapping unit 114, and a processing unit 116. The subcarrier mapping unit 114 is also referred as a mapping unit or mapping unit 114. The processing unit 116 is also referred as an inverse DFT unit or an inverse Fast Fourier transform (IFFT) unit.

The selection unit 108 receives an input 120, which may be a plurality of sequences and selects at least one sequence from the plurality of sequences. The selection unit 108 performs the selection based on an indication or an index, transmitted by a base station (BS) to a user equipment (UE). Each of the plurality of sequences may be Binary Phase Shift Keying (BPSK) sequence. The plurality of sequences comprises a plurality of sub-set of sequences such that a sequence in a sub-set of sequences is a cyclic shifted version another sequence in said sub-set of sequences. Each of the plurality of sequences is a demodulation reference sequence (DMRS). The plurality of sequences has optimized auto and cross correlation.

In an example embodiment, the selection unit 108 selects at least one sequence is one of '0 0 0 0 0 1 0 0 1 0 0 1', '0 0 1 0 0 1 0 0 0 0 0 1', and '0 0 0 0 1 1 0 1 1 1 0' for the sequence of length 12. For a sequence length of 18, the selection unit 108 may select one of 0 1 0 0 '1 1 0 1 1 0 0 0 0 0 0 1 0', '0 0 1 0 0 1 1 1 1 0 0 0 0 0 1 1 0 0', '0 0 0 0 0 0 0 1 0 0 1 0 0 1 1 0 1 1', and '0 0 0 0 0 1 1 0 0 0 0 1 0 0 1 1 1 1' sequences. For a sequence length of 24, the selection unit 108 may select one of '00 0 0 0 0 0 0 1 1 1 1 0 0 0 1 0 1 1 0 0 0 1', '1 0 0 0 1 0 1 1 0 0 0 1 0 0 0 0 0 0 0 0 0 1 1 1', and '0 0 0 0 0 0 1 1 1 0 1 1 0 0 0 1 1 0 0 0 1 0 1 0', for the sequence of length 24.

In one embodiment, the rotation unit 110 receives the selected sequence from the plurality of sequences to perform a constellation rotation operation. The rotation unit 110 performs $j^k$ rotation on the receive at least one sequence, wherein successive samples of the sequence is rotated by 90 degrees to generate a rotated sequence. The rotated sequence is fed to the DFT unit 112 for transforming the rotated sequence in to frequency domain sequence.

The DFT unit 112 performs a DFT operation on the rotated sequences to convert time domain sequences into frequency domain sequence and generate transformed sequence. The DFT unit 114 performs an M-point DFT operation on a sequence X, that may be defined as illustrated below in equation (3):

$$X_k = \sum_{l=0}^{M-1} x_n e^{\frac{-i2\pi kl}{M}}, k = 0, 1, 2, \ldots M-1 \quad i = \sqrt{-1} \quad (3)$$

The output of the DFT unit 112 is mapped with contiguous or distributed subcarriers for generating the transformed sequence. This is performed by the mapping unit 114, which performs sub-carrier mapping operation on the transformed sequences to generate mapped transformed sequence.

The processing unit 116 is configured to perform an inverse transform of the mapped transformed sequence, to generate a time domain signal. In an embodiment, the processing unit comprises one of inverse DFT and inverse FFT. After the IDFT or IFFT operation on the mapped transformed sequence, an output unit (not shown in the Figure) performs at least one of addition of cyclic prefix, cyclic suffix, windowing, windowing with overlap and adding operation (WOLA) on the time domain signal to generate output sequence 122. A half subcarrier frequency shift may be applied to avoid DC transmission. In an embodiment, the output sequence 122 may be fed to the digital to analog converter to generate an analog waveform.

In an embodiment, the transmitter 100 optionally comprises a filter 130 for performing circular convolution on the modulated sequence using a shaping filter to obtain filtered sequences. The transmitter is a UE transmitter which also referred as a communication system. This is as shown in FIG. 1B.

Figure 1B:
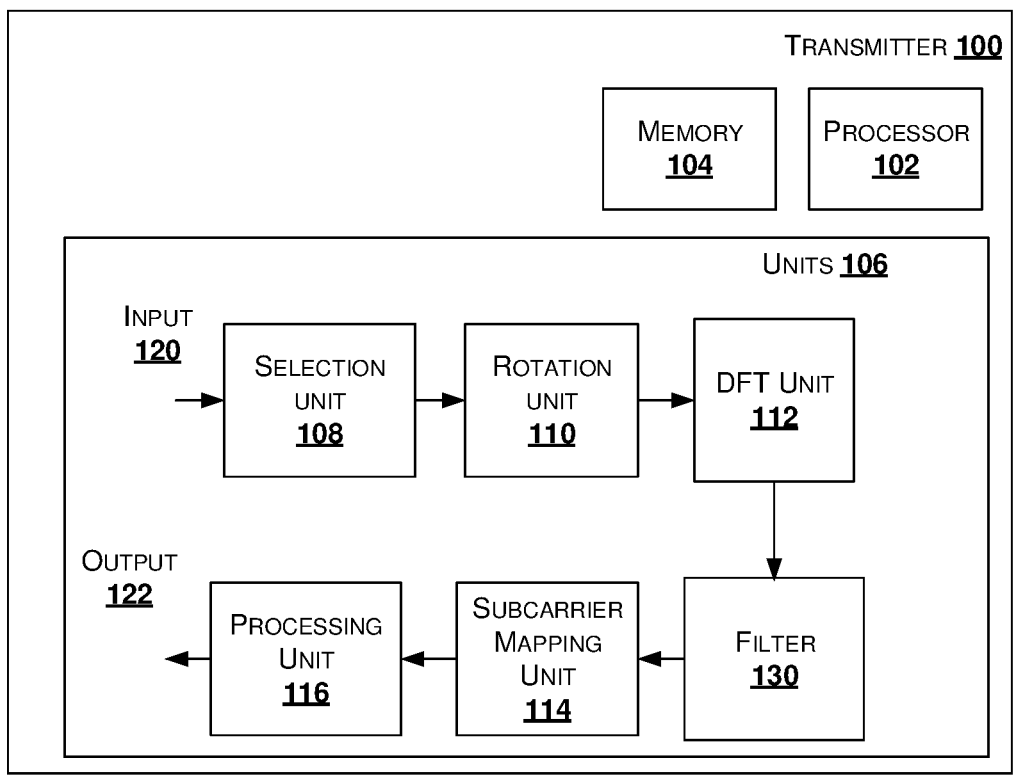
FIGS. 1B and 1C shows a block diagram of a transmitter for generating a waveform in a communication network, in accordance with an alternate embodiments of the present disclosure.
Figure 1C:
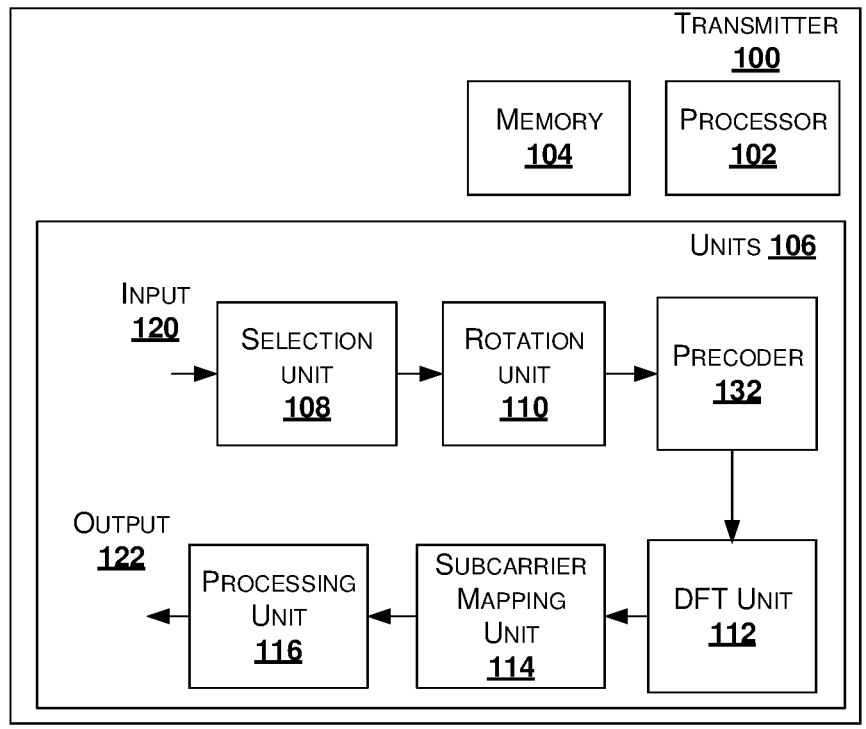

FIGS. 1B and 1C shows a block diagram of a communication system for generating a waveform in a communication network, in accordance with an alternate embodiment of the present disclosure.

The filter may be one of DFT of 1+D precoder and 1-D precoder as illustrated below in equations (1) and (2):

$$H(D)=1+D \quad (1)$$

$$H(D)=1-D \quad (2)$$

wherein D is a delay element.

Considering a time domain processing, in another embodiment the transmitter 100 comprises an optional precoder, as shown in FIG. 1C, which represents a circular convolution of input with a two-tap filter, where the two taps have equal values. The transmitter is a UE transmitter which also referred as a communication system. The precoder 132 reduces PAPR of the output waveform significantly. The precoder 132 output is a pre-coded data, which is fed to the sub-carrier mapping unit 114.

In an embodiment, considering the precoder is a 1+D precoder or =0.26 $D^{-1}$+0.92+0.26 D precoder, then the DFT 112 and subcarrier mapping unit 114 performs a subcarrier mapping such that the DFT is taken over the range 0, ..., M−1, then the left half of DFT output will be swapped with right half. In another embodiment, if the precoder is a 1−D precoder or =−0.26 $D^{-1}$+0.92−0.26 D and if the DFT is taken over the range 0, ..., M−1, then the output of the DFT unit 114 output will be directly mapped to one of contiguous and distributed subcarriers.

Figure 1D:
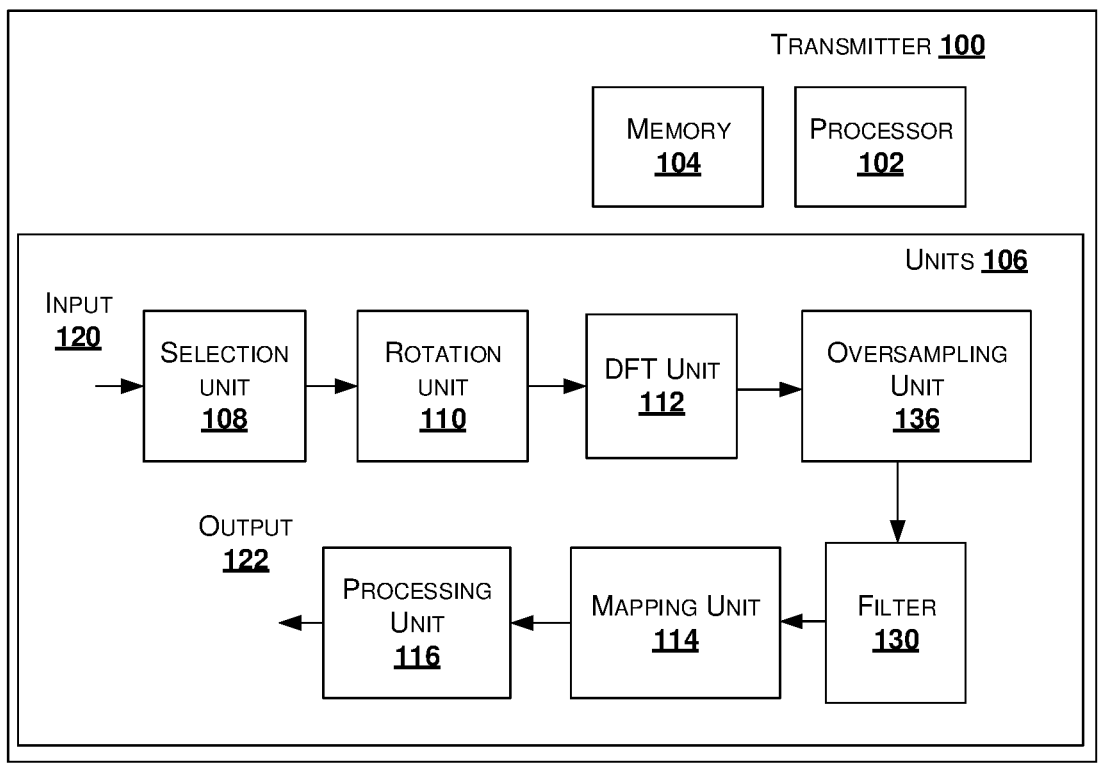
FIG. 1D shows a block diagram of a transmitter for generating a waveform in a communication network, in accordance with yet another alternate embodiment of the present disclosure.

In another embodiment, the transmitter 100 includes an optional filter 130 and an oversampling unit 136. The oversampling unit 136 oversamples the transformed sequence by a factor of P to generate an oversampled transformed sequence, said oversampled transformed sequence has P zeros between any two consecutive samples of the transformed sequence, said P is an integer. The P is an integer with value ranging from 2 to 8. The oversampled transformed sequence is filtered using the filter 130 to generate filtered sequence which is mapped using mapping unit 112, by a plurality of subcarriers to generate a mapped transformed sequence, which is as shown in FIG. 1D. The filter is DFT of one of 1+D precoder and 1−D Precoder, followed by oversampling, said filter has P zeros between any two consecutive samples of DFT of one of the 1+D precoder and 1−D precoder. FIG. 1D shows a block diagram of a transmitter for generating a waveform in a communication network, in accordance with yet another embodiment of the present disclosure.

In another embodiment, the precoder may be a filter with real or complex-values whose length is less than or equal to the DFT size. In yet another embodiment, the precoder may be alternatively implemented in frequency domain after the DFT as a subcarrier level filter. The subcarrier filter may be computed as the M-point DFT of the time domain precoder.

In an embodiment, the transmitter 100 performs subcarrier mapping on the transformed sequences using the mapping unit 114 by skipping every P tones/subcarriers. That is, mapping the transformed sequence is performed using a plurality of subcarriers to generate a mapped transformed sequence, said mapped transformed sequence includes 'P' zeros between any two consecutive samples of a mapped transformed sequence, said P is an integer. The value of P may be varied in between 2 and 8. Alternative to time domain convolution, spectrum shaping may be performed after DFT, using frequency domain filter. In an embodiment, the spectrum shaping filter is also applied on data and RS.

In an embodiment, a search is performed to obtain S base sequences with low auto, low cross correlation and good spectrum flatness. In this search method, a base station allocates an ID that indicates the base sequence to be used by the UE.

In another embodiment, a search is performed to obtain S base sequences, wherein each base sequence has a number of circularly shifted sequences that have zero correlation between base and corresponding circularly shifted sequence version. The cross correlation between all bases and all circularly shifted version are minimized. In this method, the base station indicates a base sequence and a circular shift to the UE so that the UE can apply a circularly shifted base sequence. However, the usage of the circular shifts should be done judiciously.

In an embodiment, the allocated circularly shifted sequences depends on the employed time domain precoder length (that captures maximum energy). In the absence of a filter, all circular shifts can be used. However, when the filter length is constrained to be 3 as in the case of NR standard, it is preferable that the base sequence (ie first base sequence) is allocated in one cell, then every $4^{th}$ sequence (that has 3 circular shift) can be allocated in neighboring cells. Therefore the method, the number shifts depend of maximum filter length (ie the filter taps that carry dominant energy). The key principle here is that, the base sequence with zero autocorrelation for many lags provides very good channel estimation in the presence of ISI caused by the filter. The first L shifts will be useful in estimation a channel of total length L. When frequency selective channel does not introduce additional ISI as in the case of narrowband allocations, the sequences obtained using every L-th circular shift can be allocated in neighboring cell. This way get optimum channel estimation performance that mitigates both ISI and interference caused by RS of neighbor cells. In the event the proposal channel has addition ISI of its own then the base sequence followed by a sequence that takes L-v circular shifts can be allocation in other cells where v is the significant ISI taps caused by propagation channel. A number of base sequence and its associated circular shifts are tabulated below. However, the communication system 100 uses only subset of shifts.

In an embodiment of the present disclosure, the communication system 100 is configured with low PAPR sequences that may be used as demodulation reference signal (DMRS) for coherent detection in the uplink DFT-s-OFDM. Also, π/2 BPSK modulation with spectrum shaping and ZC/QPSK sequences as DMRS is supported for the uplink DFT-s-OFDM. The PAPR of ZC/QPSK sequences is found to be relatively higher compared to the π/2 BPSK modulated data.

In one embodiment of the present disclosure, since ZC sequences may have higher PAPR especially after spectrum shaping, the power level of the ZC based RC can be reduced (or de-boosted) compared to the data carrying pi/2 BPSK PUSCH or pi/2 BPSK PUCCH so that the RS does not go through PA clipping. The de-boosting operation may be implementation specific or the value-of de-boosting power reduction is specified in the standard.

In another embodiment of the present disclosure, the communication system 100 configured with low PAPR sequences that may be used as sounding reference signals (SRS) for uplink pilots or reference symbols (RS) for PUCCH and PUSCH for channel estimation and also downlink channel estimation in TDD systems.

Figure 2A:
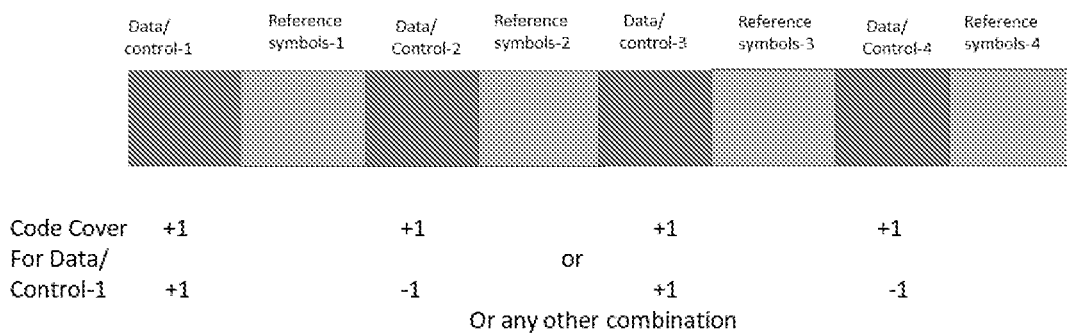
FIGS. 2A and 2B depicts illustration of a representation of input with reference symbols in a communication system, in accordance with an embodiment of the present disclosure.
Figure 2B:
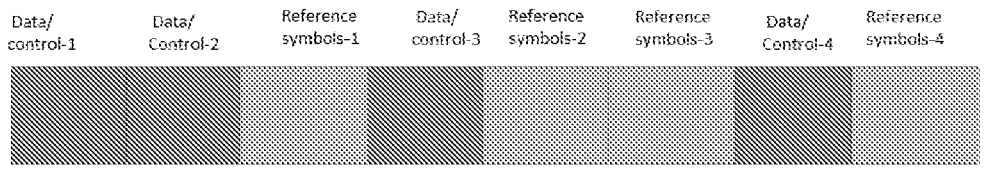

FIGS. 2A and 2B depicts illustration of a representation of input with reference symbols in a communication system, in accordance with another embodiment of the present disclosure.

As shown in FIGS. 2A and 2B, the input may be a 1 or 2-bit data/control information may be repeated over multiple OFDM symbols using a code cover. The sequence may have one subframe with control reference symbol (RS) multiplexing in accordance with an embodiment of the present disclosure. The RS may be multiplexed with control using alternating patterns with different RS density. As shown in FIG. 2A, the input is combination of sequence of data/control information and RS, repeated alternatively. FIG. 2B shows another embodiment of input sequence, which is a combination of sequence of data/control information and RS in any combination.

Figure 2C:
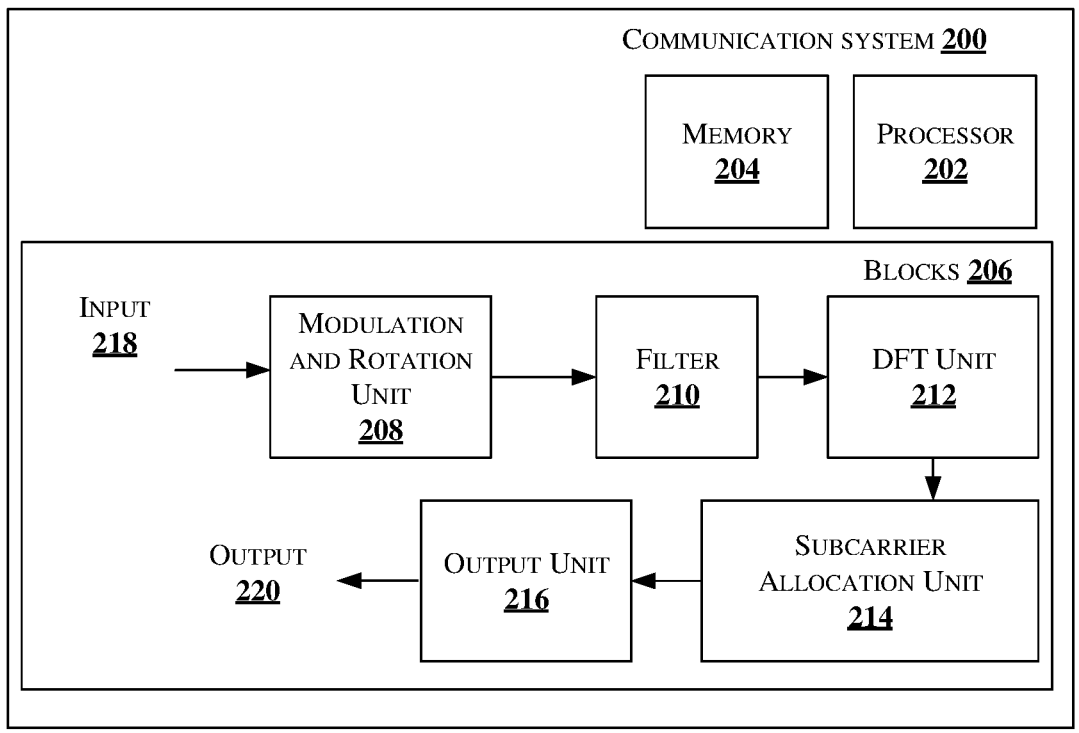
FIG. 2C shows a block diagram of a communication system for generating and transmitting a waveform in frequency domain, in accordance with an alternate embodiment of the present disclosure.

FIG. 2C shows a block diagram of a communication system for generating and transmitting a waveform from a user data which is multiplexed in frequency domain with reference signal or other user data, in accordance with an alternative embodiment of the present disclosure.

As shown in FIG. 2C, the communication system 200 includes the processor 202, and the memory 204. The memory 204 may be communicatively coupled to the processor 202. The processor 202 may be configured to perform one or more functions of the communication system 200 for receiving data. In one implementation, the communication system 200 may comprise blocks 206, also referred as units or modules, for performing various operations in accordance with the embodiments of the present disclosure. The communication system 200 is configured to multiplex user data in frequency domain. The data may be control information. The communication system 200 includes at least one transceiver (not shown in Figures) to perform receiving an input from a transmitter, and transmitting a generated waveform to a destination.

The blocks 206 includes a modulation and rotation unit 208, a precoder 210, a discrete Fourier transform (DFT) unit 212, a distributed subcarrier allocation unit 214 and an output unit 216. The discrete Fourier transform (DFT) 212 is also referred as DFT unit.

The modulation and rotation unit 208 is configured to perform modulation and rotation on the input 218 to generate rotated sequence. The input 218 is one of a plurality of reference sequence, where each of the plurality of sequences is a Binary Phase Shift Keying (BPS K) sequence. The plurality of sequences comprises a plurality of sub-set of sequences such that a sequence in a sub-set of sequences is a cyclic shifted version another sequence in said sub-set of sequences. Each of the plurality of sequences is a demodulation reference sequence (DMRS). The plurality of sequences has optimized auto and cross correlation. The rotation performed by the modulation and rotation unit 208 is constellation rotation. The modulation may be one of BPSK, QPSK and any other modulation. For BPSK modulation on the input 218, the constellation rotation factor is pi/2 i.e. 90-deg shift between successive BPSK symbols. For QPSK modulation on the input 218, the constellation rotation may be zero of pi/4. A spectrum shaping function may be applied.

The precoder 210 is configured to receive rotated sequence and generate precoded sequence, also referred as filtered sequence. The precoder may be one of 1+D precoder and 1−D precoder as illustrated below in equations (1) and (2):

$$H(D)=1+D \quad (1)$$

$$H(D)=1-D \quad (2)$$

wherein D is a delay element. In an embodiment the precoder may be a 3-tap filter of type: $H(D)=0.26\ D^{-1}+0.92+0.26\ D$ or $H(D)=-0.26\ D^{-1}+0.92-0.26\ D$. The precoder 210 reduces PAPR of the waveform significantly.

The DFT unit 212 performs a DFT spreading and sub-carrier mapping on the precoded sequence, and the output of the DFT unit 212 is mapped with contiguous or distributed subcarriers for generating the transformed sequence. The spectrum shaping may be implemented as a circular convolution in time domain or after DFT unit 212 in frequency domain as a multiplication filter at subcarrier level. The frequency domain subcarriers are one of localized and distributed.

The distributed subcarrier allocation unit 214 is configured to receive the precoded data and perform allocation of distributed subcarriers which are evenly spaced with in the allocated resource block of a length M. For example, if U users are frequency multiplexed then there are U−1 null tones between successive data subcarriers. In this example, U users may be frequency multiplexed where each user has a different starting position in subcarrier mapping. In an embodiment, the user data may comprise of data or control information or reference signal sequence.

The output unit 216 is configured to perform inverse DFT or IFFT, followed by at least one of CP addition and at least one of windowing, WOLA and filtering operations to generate an output sequence 220. The input control bits 218 may include RS which may occupy different OFDM symbols than data.

In an alternative embodiment, the multiple users may be multiplexed in time domain in different OFDM symbols, or a combination of time domain, frequency domain and code domain multiplexing to generate the output sequence 220.

Figure 2D:
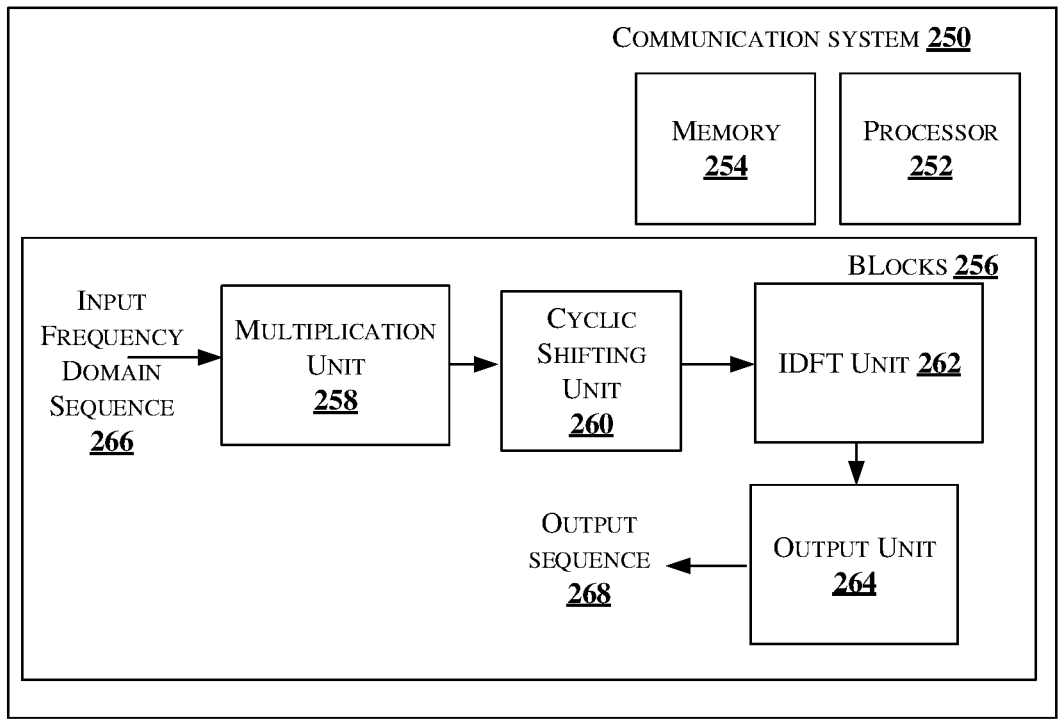
FIG. 2D shows a block diagram of a communication system for generating and transmitting a waveform in frequency domain, in accordance with another alternative embodiment of the present disclosure.

FIG. 2D shows a block diagram of a communication system for generating and transmitting a waveform from a user data which is generated directly in frequency domain, in accordance with an alternative embodiment of the present disclosure. This type of implementation is suitable for the case when 1- or 2-bit UCI is mapped to BPSK or QPSK constellation point and the constellation point is spread using a sequence that is input to the IDFY directly thus omitting the intermediate steps of constellation rotation, precoding and DFT operation resulting in a low-complexity implementation that requires specification or storage of possible frequency domain spreading sequences.

As shown in FIG. 2D, the communication system 250 includes the processor 252, and the memory 254. The memory 254 may be communicatively coupled to the processor 252. The processor 252 may be configured to perform one or more functions of the communication system 250 for receiving data. In one implementation, the communication system 250 may comprise blocks 250, also referred as units or modules, for performing various operations in accordance with the embodiments of the present disclosure. The communication system 250 is configured to send user data in frequency domain. The data may be control information. The communication system 250 includes at least one transceiver (not shown in FIG.) to perform receiving an input from a transmitter, and transmitting a generated waveform to a destination.

The blocks 256 includes a multiplication unit 258, a cyclic shifting unit 260, an inverse discrete Fourier transform (IDFT) unit 262 and an output unit 264. The frequency domain unit 258 receives an input frequency domain sequence 266 which may be obtained using a base sequence that is obtained by taking a BPSK sequence that goes through pi/2 constellation rotation, precoding and DFT operations. Various cyclic shifts of the base sequence may be used as inputs. The base sequences and the number of cyclic shifts that result in low PAPR and low correlation among the base sequences and zero correlation among the cyclic shifts of a base sequence may be obtained through a computer search. The multiplication unit 258 multiplies the input frequency domain sequence 266 with a control information carrying modulation alphabet. The modulation alphabet can be a real or complex value.

The cyclic shifting unit 260 apply cyclic shifts by multiplying the elements of the frequency domain sequence 266 with a complex exponential value that introduces required cyclic shift in frequency domain such that the cyclic shifted base sequences are orthogonal to each other. In one example, the number of cyclic shifts may be up to 6 i.e., value in the range 0,1,2,3,4,5. The time domain cyclic shift is a right or left circular shift of the base sequence. The base sequences are optimized such that the generated waveforms have optimized or low PARP. The time domain computer generated BPSK base sequences are illustrated in the below Table 1 The corresponding frequency domain base sequences are tabulated in Table 2.

TABLE 1

| S. No. | Sequence |
|---|---|
| 1 | 1 -1 -1 -1 -1 1 -1 1 -1 -1 1 1 |
| 2 | -1 -1 -1 -1 -1 1 1 -1 -1 1 1 -1 1 |
| 3 | -1 -1 -1 -1 1 1 -1 -1 1 1 1 1 -1 1 |
| 4 | 1 -1 -1 -1 1 -1 1 1 1 1 -1 -1 1 1 |
| 5 | -1 -1 -1 -1 1 1 1 -1 1 1 -1 -1 -1 1 |
| 6 | 1 -1 -1 1 1 -1 -1 -1 1 1 -1 1 1 1 -1 |
| 7 | 1 -1 -1 1 1 1 -1 1 1 1 1 1 -1 1 1 |
| 8 | 1 1 -1 -1 -1 1 1 -1 -1 -1 -1 1 1 1 |
| 9 | -1 1 1 -1 1 1 1 -1 -1 -1 -1 1 1 -1 -1 |
| 10 | -1 1 1 1 -1 1 1 -1 1 1 1 1 1 1 -1 |
| 11 | -1 1 1 1 1 -1 1 1 -1 -1 -1 -1 -1 1 1 -1 |
| 12 | 1 -1 1 1 1 -1 -1 1 1 1 1 1 1 1 -1 |
| 13 | -1 -1 -1 -1 1 1 -1 -1 -1 -1 -1 1 1 -1 1 1 1 |
| 14 | 1 -1 -1 -1 1 1 1 -1 -1 1 1 -1 1 1 -1 |
| 15 | 1 -1 -1 1 1 -1 -1 -1 -1 -1 1 1 1 -1 1 1 |
| 16 | -1 -1 -1 1 1 -1 -1 1 1 1 1 1 -1 1 1 -1 |
| 17 | 1 -1 -1 1 1 -1 1 1 1 1 1 1 -1 1 1 1 |
| 18 | -1 -1 1 1 -1 -1 -1 -1 -1 1 1 -1 1 1 1 1 |
| 19 | -1 -1 1 1 -1 -1 1 1 1 1 -1 -1 -1 -1 1 1 -1 |
| 20 | -1 -1 1 1 1 -1 1 1 -1 -1 -1 -1 1 1 -1 1 -1 -1 |
| 21 | 1 1 -1 -1 1 1 1 -1 -1 -1 -1 -1 -1 1 1 |
| 22 | 1 -1 1 1 -1 -1 -1 1 1 1 1 -1 1 1 1 1 |
| 23 | 1 1 -1 1 1 -1 1 1 1 1 1 1 1 -1 -1 1 |
| 24 | 1 1 1 1 1 1 -1 1 1 -1 1 1 1 -1 1 -1 |
| 25 | 1 -1 -1 -1 1 1 -1 1 1 -1 -1 1 1 1 -1 |
| 26 | -1 -1 -1 1 1 -1 1 1 1 1 -1 -1 -1 -1 1 1 1 |
| 27 | 1 -1 -1 1 1 -1 1 1 1 1 -1 -1 1 1 -1 |
| 28 | 1 -1 -1 1 1 1 -1 -1 1 1 1 -1 1 1 -1 1 -1 |
| 29 | 1 -1 -1 1 1 1 -1 1 1 -1 -1 -1 -1 1 1 -1 |
| 30 | 1 -1 1 -1 -1 1 1 1 1 1 -1 1 1 -1 1 -1 -1 |

Below Table 2 shows 30 sequences in frequency domain, which may be directly used by the BPSK or QPSK sequences.

TABLE 2

| S. No | DFT output |
|---|---|
| 1 | 0.0000 + 0.0000i 1.4142 + 0.3789i 1.4142 − 1.4142i −2.8284 − 2.8284i −2.4495 + 2.4495i 1.4142 + 5.2779i −2.8284 + 2.8284i −5.2779 + 1.4142i 2.4495 − 2.4495i −2.8284 + 2.8284i 1.4142 − 1.4142i −0.3789 + 1.4142i |
| 2 | 0.0000 + 0.0000i 1.4142 + 0.3789i 0.5176 − 1.9319i −2.8284 − 2.8284i −3.3461 + 0.8966i 1.4142 + 5.2779i −2.8284 − 2.8284i 3.8637 + 3.8637i −0.8966 + 3.3461i −2.8284 + 2.8284i −1.9319 + 0.5176i −1.0353 − 1.0353i |
| 3 | 0.0000 + 0.0000i −0.1895 − 0.7071i 1.7424 − 2.6390i −1.4142 − 1.4142i −4.5708 + 3.0179i −2.6390 − 0.7071i 5.6569 + 2.8284i −2.6390 + 0.7071i 0.3282 + 5.4674i −1.4142 + 1.4142i −3.1566 − 0.1895i −0.1895 + 0.7071i |
| 4 | 0.0000 + 0.0000i 0.1895 + 0.7071i −0.1895 − 3.1566i −1.4142 − 1.4142i −5.4674 − 0.3282i 2.6390 + 0.7071i 2.8284 + 5.6569i −2.6390 + 0.7071i −3.0179 + 4.5708i 1.4142 − 1.4142i −2.6390 + 1.7424i −0.1895 + 0.7071i |
| 5 | 0.0000 + 0.0000i 1.4142 + 0.3789i −1.4142 − 1.4142i −2.8284 − 2.8284i −2.4495 − 2.4495i 1.4142 + 5.2779i 2.8284 + 2.8284i −5.2779 + 1.4142i 2.4495 + 2.4495i −2.8284 + 2.8284i −1.4142 − 1.4142i −0.3789 + 1.4142i |
| 6 | 0.0000 + 0.0000i −0.3789 − 1.4142i 1.4142 − 1.4142i −2.8284 − 2.8284i −2.4495 + 2.4495i −5.2779 − 1.4142i −2.8284 + 2.8284i 1.4142 − 5.2779i 2.4495 − 2.4495i −2.8284 + 2.8284i 1.4142 − 1.4142i 1.4142 − 0.3789i |
| 7 | 0.0000 + 0.0000i −0.1895 − 0.7071i −0.1895 − 3.1566i 1.4142 + 1.4142i −5.4674 − 0.3282i −2.6390 − 0.7071i 2.8284 + 5.6569i 2.6390 − 0.7071i −3.0179 + 4.5708i −1.4142 + 1.4142i −2.6390 + 1.7424i 0.1895 − 0.7071i |
| 8 | 0.0000 + 0.0000i 1.4142 + 0.3789i 1.4142 + 1.4142i −2.8284 − 2.8284i 2.4495 + 2.4495i 1.4142 + 5.2779i −2.8284 − 2.8284i −5.2779 + 1.4142i −2.4495 − 2.4495i −2.8284 + 2.8284i 1.4142 + 1.4142i −0.3789 + 1.4142i |

TABLE 2-continued

| S. No | DFT output |
|---|---|
| 9 | 0.0000 + 0.0000i −0.3789 − 1.4142i −1.4142 + 1.4142i −2.8284 − 2.8284i 2.4495 − 2.4495i −5.2779 − 1.4142i 2.8284 − 2.8284i 1.4142 − 5.2779i −2.4495 + 2.4495i −2.8284 + 2.8284i −1.4142 + 1.4142i 1.4142 − 0.3789i |
| 10 | 0.0000 + 0.0000i −1.4142 − 0.3789i 0.5176 − 1.9319i 2.8284 + 2.8284i −3.3461 + 0.8966i −1.4142 − 5.2779i −2.8284 − 2.8284i −3.8637 − 3.8637i −0.8966 + 3.3461i 2.8284 − 2.8284i −1.9319 + 0.5176i 1.0353 + 1.0353i |
| 11 | 0.0000 + 0.0000i −0.1895 − 0.7071i −1.7424 + 2.6390i −1.4142 − 1.4142i 4.5708 − 3.0179i −2.6390 − 0.7071i −5.6569 − 2.8284i −2.6390 + 0.7071i −0.3282 − 5.4674i −1.4142 + 1.4142i 3.1566 + 0.1895i −0.1895 + 0.7071i |
| 12 | 0.0000 + 0.0000i −1.4142−0.3789i 1.4142 − 1.4142i 2.8284 + 2.8284i −2.4495 + 2.4495i −1.4142 − 5.2779i −2.8284 + 2.8284i 5.2779 − 1.4142i 2.4495 − 2.4495i 2.8284 − 2.8284i 1.4142 − 1.4142i 0.3789 − 1.4142i |
| 13 | −0.0000 + 0.0000i 1.0353 − 1.0353i 1.9319 − 0.5176i −2.8284 − 2.8284i −0.8966 + 3.3461i −3.8637 + 3.8637i 2.8284 + 2.8284i −5.2779 + 1.4142i −3.3461 + 0.8966i 2.8284 − 2.8284i −0.5176 + 1.9319i −0.3789 + 1.4142i |
| 14 | −0.0000 + 0.0000i 1.0353 − 1.0353i −0.5176 − 1.9319i −2.8284 − 2.8284i −3.3461 − 0.8966i −3.8637 + 3.8637i 2.8284 − 2.8284i −5.2779 + 1.4142i −0.8966 − 3.3461i 2.8284 − 2.8284i 1.9319 + 0.5176i −0.3789 + 1.4142i |
| 15 | 0.0000 + 0.0000i −0.3789 − 1.4142i 1.9319 − 0.5176i −2.8284 − 2.8284i −0.8966 + 3.3461i −5.2779 − 1.4142i 2.8284 + 2.8284i 3.8637 + 3.8637i −3.3461 + 0.8966i −2.8284 + 2.8284i −0.5176 + 1.9319i −1.0353 − 1.0353i |
| 16 | 0.0000 + 0.0000i −0.7071 − 0.1895i 0.1895 − 3.1566i −1.4142 − 1.4142i −5.4674 + 0.3282i −0.7071 − 2.6390i −2.8284 + 5.6569i 0.7071 − 2.6390i −3.0179 − 4.5708i 1.4142 − 1.4142i 2.6390 + 1.7424i 0.7071 − 0.1895i |
| 17 | 0.0000 + 0.0000i 0.7071 + 0.1895i 0.1895 − 3.1566i 1.4142 + 1.4142i −5.4674 + 0.3282i 0.7071 + 2.6390i −2.8284 + 5.6569i −0.7071 + 2.6390i −3.0179 − 4.5708i −1.4142 + 1.4142i 2.6390 + 1.7424i −0.7071 + 0.1895i |
| 18 | 0.0000 + 0.0000i −0.1895 − 0.7071i 3.1566 − 0.1895i −1.4142 − 1.4142i −0.3282 + 5.4674i −2.6390 − 0.7071i −5.6569 + 2.8284i −2.6390 + 0.7071i 4.5708 + 3.0179i −1.4142 + 1.4142i −1.7424 − 2.6390i −0.1895 + 0.7071i |
| 19 | 0.0000 + 0.0000i 1.0353− 1.0353i −1.9319 + 0.5176i −2.8284 − 2.8284i 0.8966 − 3.3461i −3.8637 + 3.8637i −2.8284 − 2.8284i −5.2779 + 1.4142i 3.3461 − 0.8966i 2.8284 − 2.8284i 0.5176 − 1.9319i −0.3789 + 1.4142i |
| 20 | 0.0000 − 0.0000i −0.3789 − 1.4142i −1.9319 + 0.5176i −2.8284 − 2.8284i 0.8966 − 3.3461i −5.2779 − 1.4142i −2.8284 − 2.8284i 3.8637 + 3.8637i 3.3461 − 0.8966i −2.8284 + 2.8284i 0.5176 − 1.9319i −1.0353 − 1.0353i |
| 21 | 0.0000 + 0.0000i 1.4142 + 0.3789i −1.4142 + 1.4142i −2.8284 − 2.8284i 2.4495 − 2.4495i 1.4142 + 5.2779i 2.8284 − 2.8284i −5.2779 + 1.4142i −2.4495 + 2.4495i −2.8284 + 2.8284i −1.4142 + 1.4142i −0.3789 + 1.4142i |
| 22 | 0.0000 + 0.0000i 0.1895 + 0.7071i 3.1566 − 0.1895i 1.4142 + 1.4142i −0.3282 + 5.4674i 2.6390 + 0.7071i −5.6569 + 2.8284i 2.6390 − 0.7071i 4.5708 + 3.0179i 1.4142 − 1.4142i −1.7424 − 2.6390i 0.1895 − 0.7071i |
| 23 | −0.0000 + 0.0000i −1.0353 + 1.0353i −0.5176 − 1.9319i 2.8284 + 2.8284i −3.3461 − 0.8966i 3.8637 − 3.8637i 2.8284 − 2.8284i 5.2779 − 1.4142i −0.8966 − 3.3461i −2.8284 − 2.8284i 1.9319 + 0.5176i 0.3789 − 1.4142i |
| 24 | 0.0000 + 0.0000i −1.4142 − 0.3789i −1.4142 + 1.4142i 2.8284 + 2.8284i 2.4495 − 2.4495i −1.4142 − 5.2779i 2.8284 − 2.8284i 5.2779 − 1.4142i −2.4495 + 2.4495i 2.8284 − 2.8284i −1.4142 + 1.4142i 0.3789 − 1.4142i |
| 25 | 0.0000 + 0.0000i 1.0353 − 1.0353i 0.5176 − 1.9319i −2.8284 − 2.8284i −3.3461 + 0.8966i −3.8637 + 3.8637i −2.8284 − 2.8284i 1.4142 − 5.2779i −0.8966 + 3.3461i 2.8284 − 2.8284i −1.9319 + 0.5176i 1.4142 − 0.3789i |
| 26 | 0.0000 + 0.0000i 1.4142 + 0.3789i −1.9319 − 0.5176i −2.8284 − 2.8284i −0.8966 − 3.3461i 1.4142 + 5.2779i −2.8284 + 2.8284i 3.8637 + 3.8637i −3.3461 − 0.8966i −2.8284 + 2.8284i 0.5176 + 1.9319i −1.0353 − 1.0353i |
| 27 | 0.0000 + 0.0000i 0.7071 + 0.1895i −1.7424 + 2.6390i −1.4142 − 1.4142i −4.5708 − 3.0179i 0.7071 + 2.6390i −5.6569 + 2.8284i 0.7071 − 2.6390i 0.3282 − 5.4674i −1.4142 + 1.4142i 3.1566 − 0.1895i 0.7071 − 0.1895i |
| 28 | 0.0000 + 0.0000i −0.3789− 1.4142i −1.4142 − 1.4142i −2.8284 − 2.8284i −2.4495 − 2.4495i −5.2779 − 1.4142i 2.8284 + 2.8284i 1.4142 − 5.2779i 2.4495 + 2.4495i −2.8284 + 2.8284i −1.4142 + 1.4142i 1.4142 − 0.3789i |
| 29 | 0.0000 + 0.0000i 1.0353 − 1.0353i −1.9319 − 0.5176i −2.8284 − 2.8284i −0.8966 − 3.3461i −3.8637 + 3.8637i −2.8284 + 2.8284i 1.4142 − 5.2779i −3.3461 − 0.8966i 2.8284 − 2.8284i 0.5176 + 1.9319i 1.4142 − 0.37891 |
| 30 | 0.0000 + 0.0000i −0.5176 + 0.5176i −1.4142 − 2.8284i −1.4142 − 1.4142i −4.8990 − 2.4495i 1.9319 − 1.9319i −5.6569 − 2.8284i 1.9319 + 1.9319i 4.8990 + 2.4495i −1.4142 + 1.4142i −1.4142 − 2.8284i −0.5176 − 0.5176i |

The IDFT unit 262 is configured to perform inverse DFT or IFFT of the cyclic shifted frequency domain sequence to generate IDFT data. Thereafter, the output unit 264 performs one of CP addition and at least one of windowing, WOLA and filtering operations to generate an output sequence 268.

Figure 3:
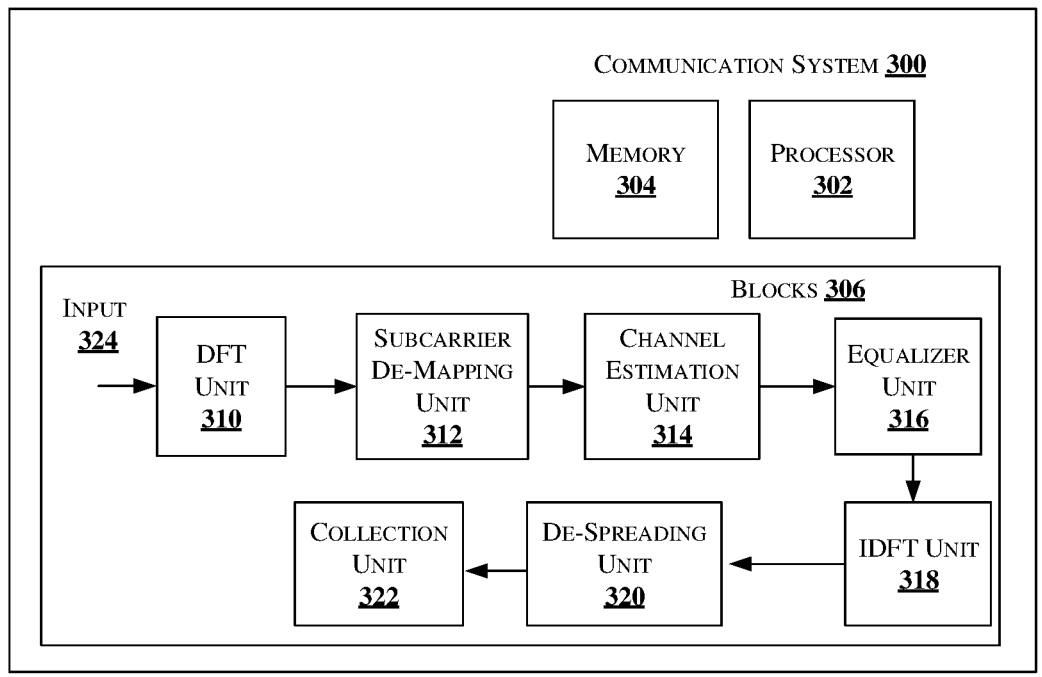
FIG. 3 shows a block diagram illustration of a communication system for receiving waveform, in accordance with an embodiment of the present disclosure.

FIG. 3 shows a block diagram illustration of a communication system 300 for receiving waveform, in accordance with an embodiment of the present disclosure.

As shown in FIG. 3, the communication system 300 includes a processor 302, and memory 304. The communication system 300 is also referred as a receiver. The memory 304 may be communicatively coupled to the processor 302. The processor 302 may be configured to perform one or more functions of the receiver 300 for receiving data. In one implementation, the receiver 300 may comprise blocks 306, also referred as unit or modules, for performing various operations in accordance with the embodiments of the present disclosure.

The blocks 306 includes a discrete Fourier Transform (DFT) unit 310, a subcarrier de-mapping unit 312, a channel estimation unit 314, an equalizer unit 316, an inverse discrete Fourier Transform (IDFT) 318, a De-spreading/Demodulation unit 320 and a collection unit 322.

The DFT unit 310 is also referred as fast Fourier Transform (FFT) unit. The DFT unit 310 is configured to perform a DFT/FFT operation of the input 324 to generate transformed data.

The subcarrier de-mapping unit 312 performs the de-mapping operation on the transformed data, to collect allocated subcarriers. The channel estimation unit 314 performs estimation of channel through which the receiver 300 receives the input 324. After performing the channel estimation, the equalizer unit 316 performs equalization of constellation de-rotated data. In another embodiment, when the transmitter uses pi/2 BPSK sequences, the equalizer unit 316 is a widely linear equalizer unit for filtering the de-mapped transformed output data is performed using a widely linear equalizer to generate filtered data by removing effects associated with physical channel and the precoder in the communication network.

The IDFT unit 318 performs inverse Fourier transformation of equalized data and then followed by demodulation or soft demodulation on the transformed data using the De-spreading unit 320 to generate de-spread data. Thereafter, the collection unit 322 collects the data de-spread data, thereby identifying the received input.

In one embodiment, the BS 100, 200 may use a code cover across multiple OFDM symbols to increase multiplexing capacity. For example, first and second indices, having same value, may be assigned to a group of multiplexed users. However, user's data may be separated at the receiver by using an orthogonal code cover that is a sequence where elements of the sequence are multiplexed with a control signal occupied in the OFDM symbols, where users are time multiplexed. The orthogonal code cover may be Walsh Hadamard sequence or DFT sequence. Similarly, if multiple users are multiplexed on the same time frequency resource, the RS occupied by the users over multiple OFDM symbols are designed to be orthogonal sequences across multiplexed users. Orthogonality may be achieved by a sequence within OFDM symbols or across OFDM symbols. For example, in case of ZC sequences, different shifts may be used across RS of OFDM symbols. If same shift is used across multiple OFDM symbols, then an orthogonal code cover is used to separate multiple users who are multiplexed on the same resources.

In an embodiment, a combination of the first shift, second shift (cyclic shift) and orthogonal code cover may be used for the control information that is spread across multiple OFDM symbols to reduce interference caused by co-channel control transmissions that occur in other cells/BSs. A scheduler (not shown in Figures) configured in the BS may coordinate through allocation of appropriate indices and code covers.

In an embodiment, considering user multiplexing capacity is less than 6, a BS may multiplex less than 6 users on the same resource. In such a scenario, the available second indices (shifts) may be used in other cells/BSs. More specifically, two or three adjacent sectors may use the same first index (base sequence) and distinct second indices (shifts) so that control transmissions across three sectors are orthogonal in three sectors. This may be achieved by assigning same first index of base sequence to all three sectors and further allocate shifts (1,2) in first sector, shifts (3,4) in second sector and shifts (5,6) in another sector where each sector multiplexes two users in the same OFDM symbols.

Figure 4:
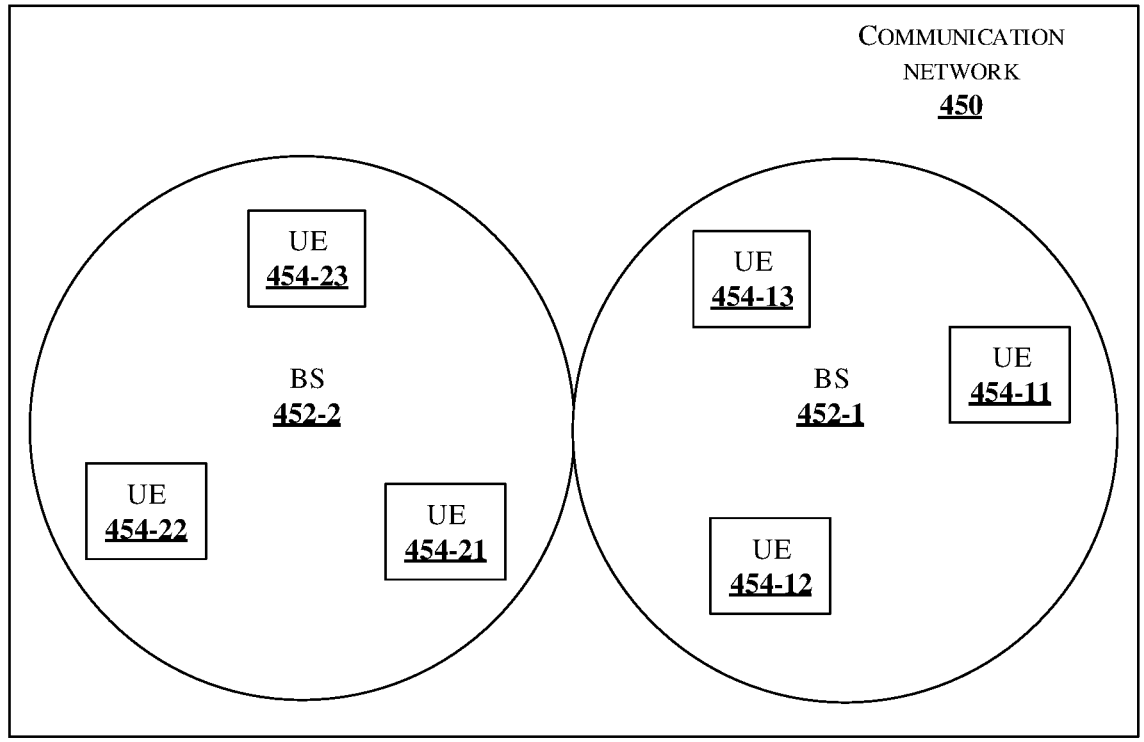
FIG. 4 illustrates an example scenario of Base stations (BSs) that multiplex user equipment's, in accordance with an embodiment of the present disclosure.

FIG. 4 illustrates an example scenario of BSs that multiplex user equipment's, in accordance with an embodiment of the present disclosure.

As shown in FIG. 4, in a communication network 450, considering a first BS 452-1 and a second BS 452-2 each with three sectors. A scheduler may allocate different first indices or different base sequences, to the first BS 452-1 and the second BS 452-2 so that sequences allocated have very low cross correlation i.e. including zero cross correlation between codes allocates users of first BS 452-1 and second BS 452-2.

In an embodiment, the above base sequences may be used as RS without multiplying with BPSK or QPSK control information. Alternatively, ZC sequences may be used for RS. In an embodiment, a pool of base sequences shown in Set 2 may be used.

In another embodiment, neighbouring sectors may allocate same base sequence and allocate a reduced number of shifts for user multiplexing. For example, if each sector multiplexes a maximum of two users in one OFDM symbol, then each sector may use 2 out of 6 shifts of a base sequence such that three sectors have six users using 6 different shifts resulting interference free communications between the six users located in a BS (3-sectors). This embodiment may be extended to other BS using remaining base sequences.

In an embodiment, multiplexing capacity in a sector may be increased more than 6 per base sequence by repeating the control information in multiple OFDM symbols and using OFDM symbol specific code cover or further spreading code over OFDM symbols. Similarly, multiplexing may be used for RS design to increase user multiplexing.

In an embodiment where the user communication control or data using a spreading sequence, the BS does not signal or indicate the spreading sequence to the user, the user may choose one of the available sets of spreading sequences specified by the base sequences and/or the cyclic shift. The user may randomly choose either the base sequence or a shift or both. The base station receiver would have to decode all possible spreading sequences characterized by the base sequences and/or cyclic shifts in order to determine the set of spreading sequences used, and also the information carried by the users.

Figure 5A:
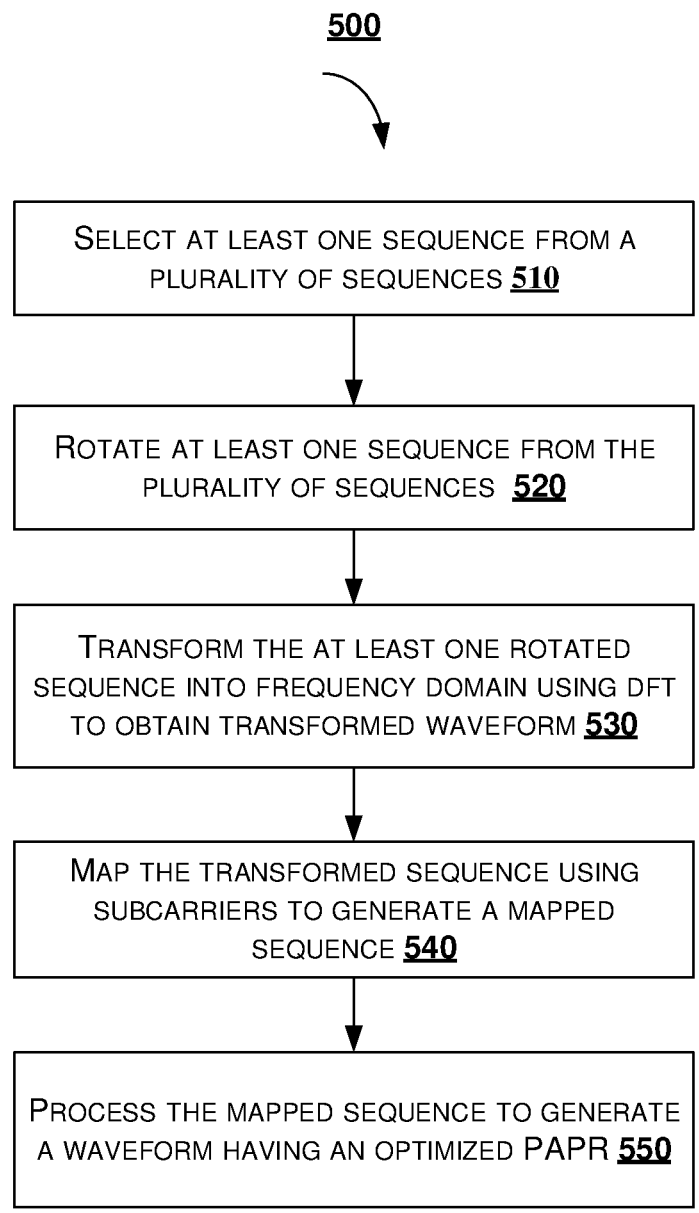
FIG. 5A shows a flowchart illustrating a method of generating waveform by a transmitter, in accordance with some embodiments of the present disclosure.

FIG. 5A shows a flowchart illustrating a method of generating waveform by a communication system, in accordance with some embodiments of the present disclosure.

As illustrated in FIG. 5A, the method 500 comprises one or more blocks for generating a waveform by a communication system, having an optimized PAPR and optimized auto-correlation and cross-correlation. The method 500 may be described in the general context of computer executable instructions. Generally, computer executable instructions can include routines, programs, objects, components, data structures, procedures, modules, and functions, which perform functions or implement abstract data types.

The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 510, selecting at least one sequence from a plurality input sequences, which is performed by a selection unit 108 configured in the communication system 100. The input sequences 120 may be BPSK symbols. In an embodiment, the input sequence 120 may be a BPSK sequence. The plurality of sequences comprises a plurality of sub-set of sequences such that a sequence in a sub-set of sequences is a cyclic shifted version another sequence in said sub-set of sequences. Each of the plurality of sequences is a reference sequence or demodulation reference sequence (DMRS). The plurality of sequences has optimized auto and cross correlation.

At block 520, a rotation operation is performed on the at least one selected sequence from the plurality of sequences to produce a rotated data. The rotation operation is performed using the rotation unit 110, which performs constellation rotation on the received at least one sequence, wherein successive samples of the sequence are rotated by 90 degrees. The rotation unit 110 performs $j^k$ rotation on the input 120 i.e., on the BPSK sequence to generate a rotated sequence. The rotated sequence is fed to DFT unit 112 for transforming the rotated sequences in to frequency domain.

At block 530, transforming is performed on the at least one rotated sequence using Discrete Fourier Transform (DFT) to convert time domain sequence in to frequency domain sequence, to generate transformed sequence. In an embodiment, the transforming may be performed using Fast Fourier Transform (FFT).

At block 540, mapping the transformed sequence is performed using subcarriers to generate mapped transformed sequence. In one embodiment, the output of the DFT unit 112 is mapped with contiguous or distributed subcarriers for generating the mapped transformed sequence.

In an embodiment, considering an optional filter 130, which may be a 1+D filter, then the DFT unit 112 and mapping unit 114 performs a subcarrier mapping such that the DFT is taken over the range 0, . . . , M−1, then the left half of DFT output will be swapped with right half. In another embodiment, if the filter 130 is a 1−D precoder and if the DFT is taken over the range 0, . . . , M−1, then the output of the DFT unit 112 output will be directly mapped to one of contiguous and distributed subcarriers.

In another embodiment, the filter also referred as a precoder may be a real or complex-values whose length is less than or equal to the DFT size. In yet another embodiment, the filter may be alternatively implemented in frequency domain after the DFT as a subcarrier level filter. The said subcarrier filter may be computed as the M-point DFT of the time domain precoder.

At block 550, processing the mapped transformed sequence to generate a waveform with optimized or low PAPR. In one embodiment, the processing unit 116, also referred as an IDFT unit or module 116, is configured to perform an inverse transform of the transformed sequence, to generate a time domain signal. After the IDFT or IFFT operation, optionally the processing unit 16 performs at least one of addition of cyclic prefix, cyclic suffix, windowing, windowing with overlap and adding operation (WOLA) on the time domain signal to generate output sequence 122. A half subcarrier frequency shift may be applied to avoid DC transmission. In an embodiment, the output sequence 122 may be fed to the digital to analog converter to generate an analog waveform.

Figure 5B:
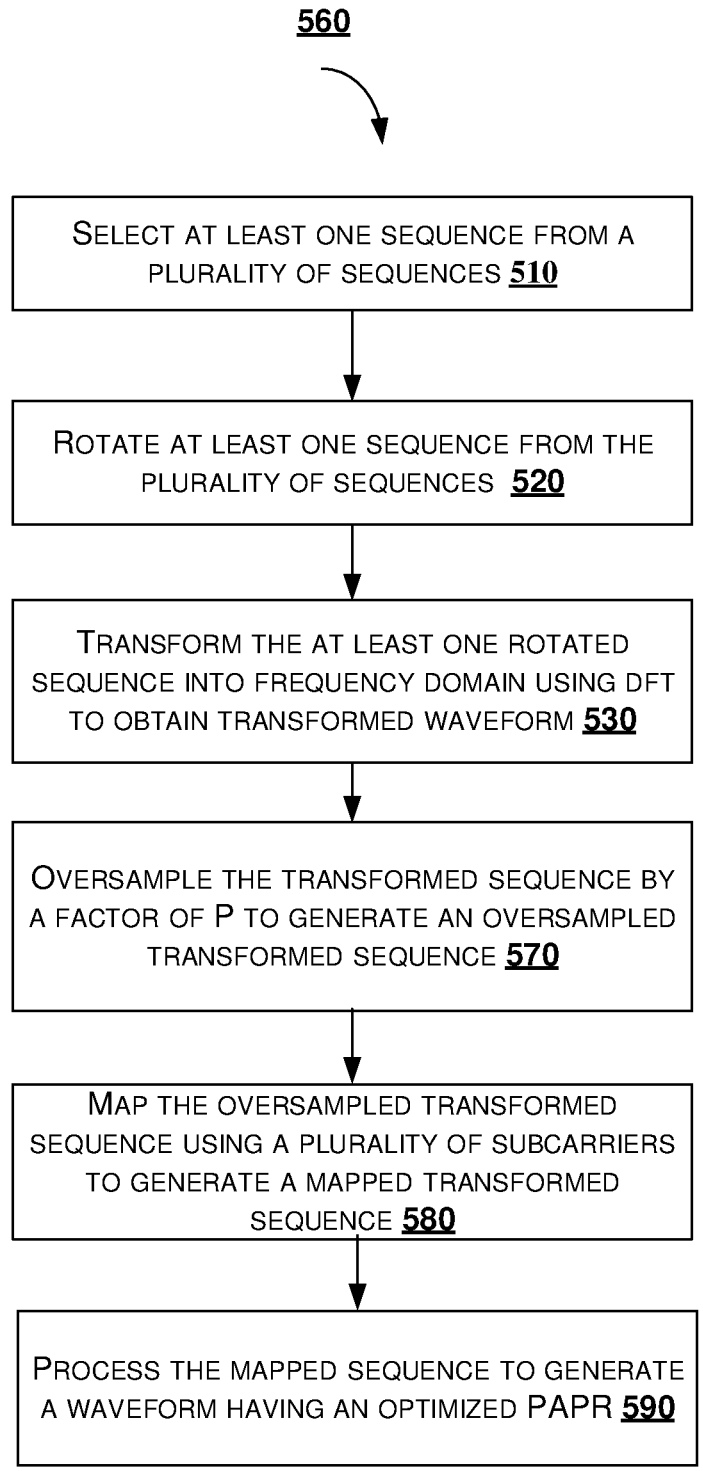
FIG. 5B shows a flowchart illustrating a method of generating waveform by a transmitter, in accordance with an alternative embodiments of the present disclosure.

FIG. 5B shows a flowchart illustrating a method of generating waveform by a communication system, in accordance with an alternate embodiment of the present disclosure.

As illustrated in FIG. 5B, the method 560 comprises one or more blocks for generating a waveform by a communication system, having an optimized PAPR and optimized auto-correlation and cross-correlation. Generally, computer executable instructions can include routines, programs, objects, components, data structures, procedures, modules, and functions, which perform functions or implement abstract data types.

The order in which the method 560 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

The method 560 steps at block 510, 520, 530 are same as the method steps of 500 i.e. selecting at least one sequence from a plurality input sequences, a rotation operation is performed on the at least one selected sequence from the plurality of sequences to produce a rotated data and transforming the at least one rotated sequence to convert time domain sequence in to frequency domain sequence, to generate transformed sequence.

At block 570, oversampling is performed on the transformed sequence by a factor of P to generate an oversampled transformed sequence, said oversampled transformed sequence has P zeros between any two consecutive samples of the transformed sequence, said P is an integer.

At block 580, mapping, by the transmitter, the oversampled transformed sequence using a plurality of subcarriers to generate a mapped transformed sequence.

At block 590, processing the mapped transformed sequence to generate a waveform with optimized or low PAPR. In one embodiment, the processing unit 116, also referred as an IDFT unit or module 116, is configured to perform an inverse transform of the transformed sequence, to generate a time domain signal. After the IDFT or IFFT operation, optionally the processing unit 16 performs at least one of addition of cyclic prefix, cyclic suffix, windowing, windowing with overlap and adding operation (WOLA) on the time domain signal to generate output sequence 122. A half subcarrier frequency shift may be applied to avoid DC transmission. In an embodiment, the output sequence 122 may be fed to the digital to analog converter to generate an analog waveform.

Figure 6:
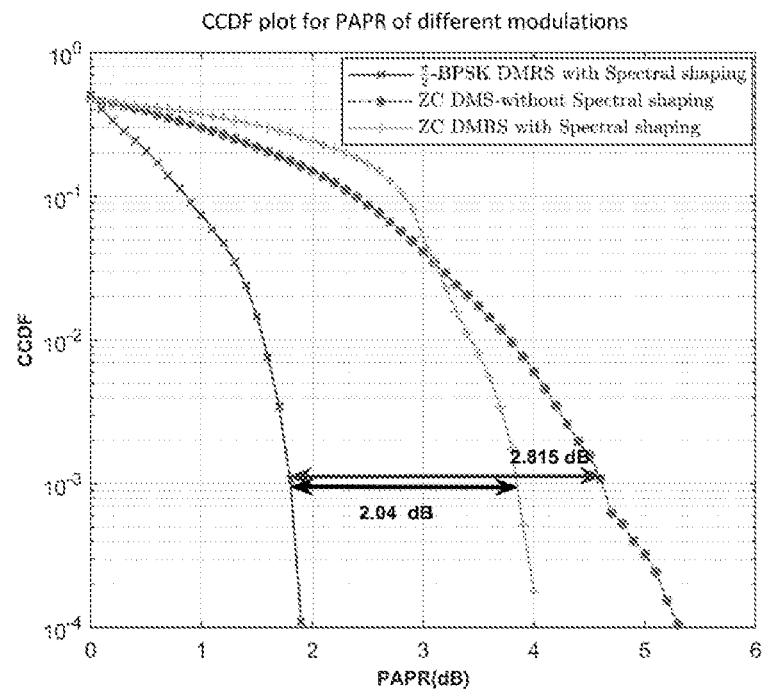
FIG. 6 shows a CCDF plot illustrating PAPR of different modulations, in accordance with some embodiments of the present disclosure.

FIG. 6 shows a CCDF plot illustrating PAPR of different modulations, in accordance with some embodiments of the present disclosure. The CCDF of PAPR for ZC sequences and π/2-BPSK sequences is shown in the FIG. 6. The ZC sequences considered in this case are as defined in with length 96. As shown in FIG. 6, the ZC sequences without spectrum shaping have a PAPR 2.8 dB more than the π/2-BPSK sequences, at the $10^{-3}$ CDF point. When spectrum shaping is applied to the ZC sequences, the PAPR is slightly reduced compared to un-filtered ZC sequences. However, the PAPR of the filtered ZC sequences is still 2.0 dB larger than the PAPR of the π/2-BPSK sequences with the same spectrum shaping.

Figure 7:
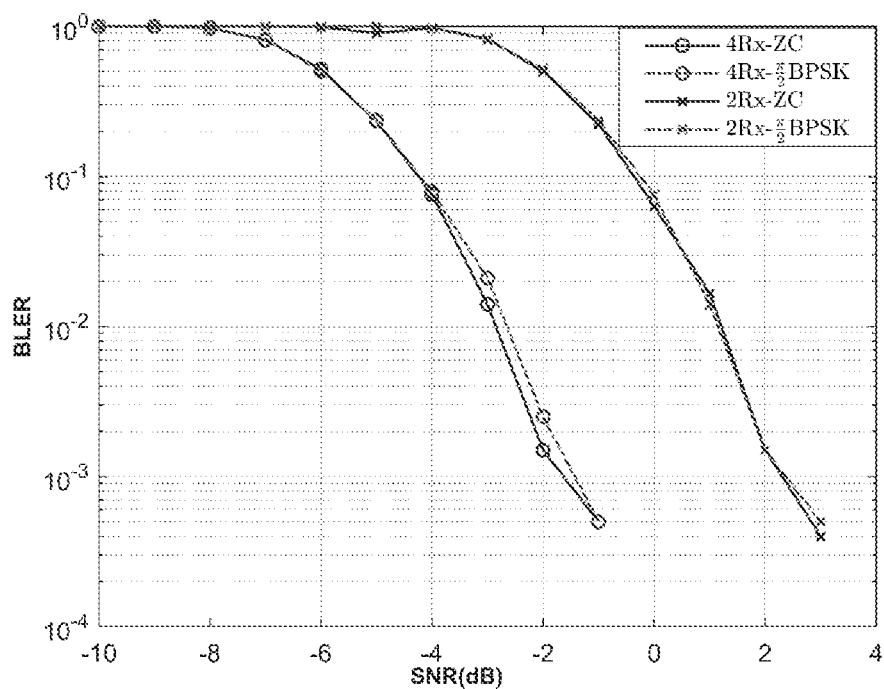
FIG. 7 shows a plot illustrating block error rate performance for a transmission, in accordance with some embodiments of the present disclosure.

FIG. 7 shows a plot illustrating block error rate performance for a transmission, in accordance with some embodiments of the present disclosure. The block error rate performance for a data transmission is shown in the FIG. 7. The sequences generated by the transmitter 100 facilitates by ensuring that they match the performance of these ZC sequences. In this FIG. 7, the results are shown for the cases when the base station receiver employs 2 and 4 receive antennas. Also as shown in FIG. 7, it can be seen that the link-level performance of π/2-BPSK sequence is equivalent to that of 3GPP ZC sequences, although these sequences are not frequency-flat like ZC sequences.

Figures 8, 9:
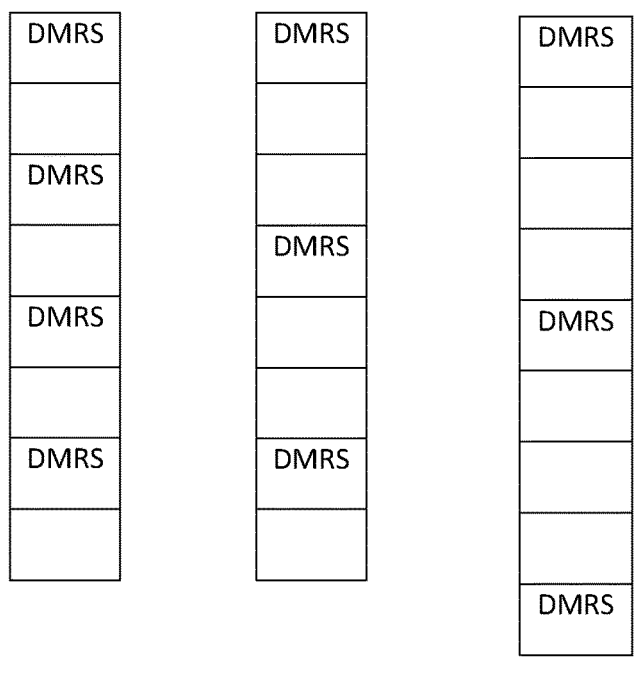
FIG. 8 shows an illustration of a general structure of DMRS and data multiplexing across time, in accordance with an embodiment of the present disclosure.
FIG. 9 shows an illustration of DMRS resource element (RE) allocation, in accordance with an embodiment of the present disclosure.

FIG. 8 shows an illustration of a general structure of DMRS and data multiplexing across time, in accordance with an embodiment of the present disclosure. The communication system 100 performs channel estimation using the DMRS symbols followed by channel equalization on data symbols, to retrieve back the transmitted data.

FIG. 9 shows an illustration of DMRS resource element (RE) allocation, in accordance with an embodiment of the present disclosure. As shown in FIG. 9, in NR uplink, DMRS symbols doesn't have contiguous RE (resource element or subcarrier) allocations but rather may have comb like structure i.e. distributed allocation where every alternate RE will be contained DMRS or DMRS may possibly contained on every 'P' tone, where P is one of 2, 3, 4 . . . .

In an embodiment, the π/2-BPSK modulation with spectral shaping for uplink DFT-s-OFDM for both control and data channels is supported. ZC/QPSK-based CGS are employed as DMRS for coherent detection for these cases. Also, the DMRS sequences and the data have different PAPR, more specifically, the DMRS sequences in NR Rel-15 have higher PAPR compared to PU×CH channels when they use π/2-BPSK modulation. Hence, to resolve this disparity and make the PAPR of the DMRS sequence same as that of PU×CH channels without compromising the system performance where PUXCH can be PUCCH or PUSCH. In case of PUSCH a comb like DMRS will used with P=2,4 etc and for PUCCH the RS spans the while allocation. The RS is generated such that its length is aligned to DMRS comb structure. The following shows the method of sequence generation and allocation. The BS may allocate a sequence from an available pool of sequences using an index.

Considering the above, the π/2-BPSK-based DMRS sequences with spectral shaping which possess significantly low PAPR compared to existing ZC based DMRS sequences while simultaneously providing excellent correlation properties. Specifically, two sets of pi/2-BPSK based computer generated 30 base sequences for each of the lower PRB allocations, i.e., length 6, 12, 18, 24 which have better auto- and cross-correlation properties besides having minimal PAPR is provided. In one set, the provided 30 base sequences which possess good auto correlation properties such that inter-cell/inter-sector collision can be minimized specifically for the cell edge UEs. The second set of 30 base sequences is constructed such that circular shifts of the base sequences will result in orthogonal sequences while having low PAPR and hence can be used for multiplexing several users.

In order to show the merit of the proposed sequences, comparing the PAPR of these pi/2-BPSK based CGS with that of existing NR DMRS sequences. Also, comparing the bit error performance after coherent detection in all the cases, it shows that π/2 BPSK sequences with 1–D pulse shaping provides a total power gain of nearly 2.0 dB compared to existing sequences (c.f. TR 38.211 Clause 5.2.2) without much loss in the error performance.

Figure 10:
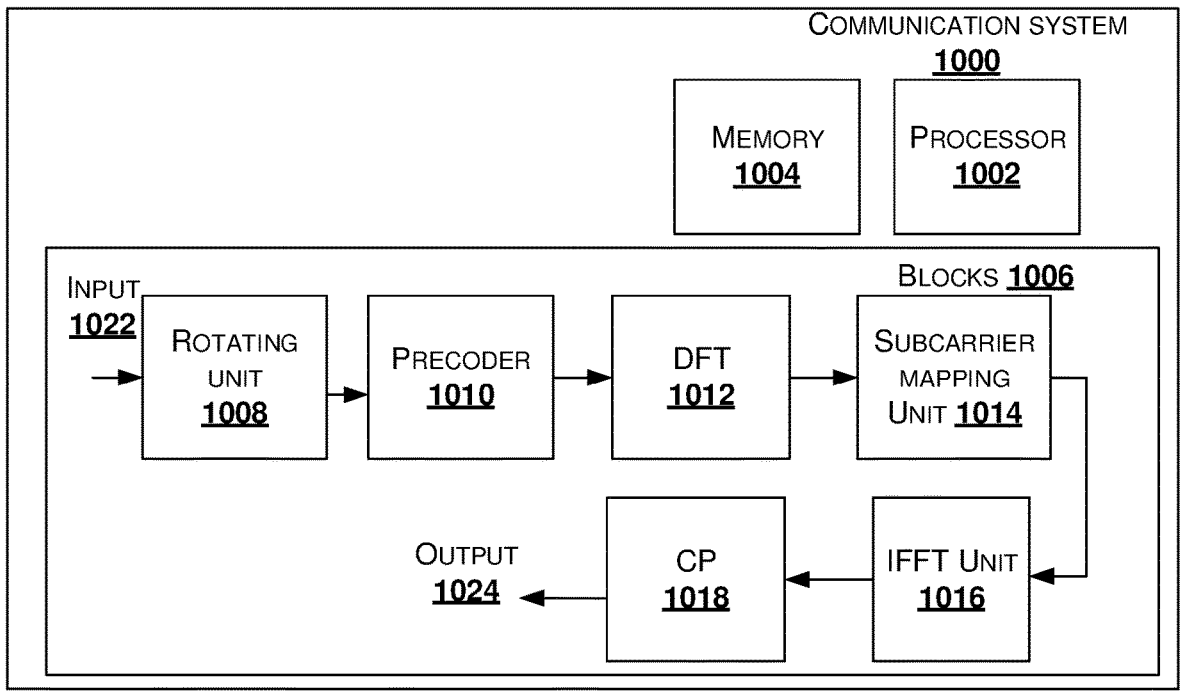
FIG. 10 shows a block diagram of a communication system for generating CGS sequence based DMRS Design for pi/2 BPSK Modulation, in accordance with an embodiment of the present disclosure.

FIG. 10 shows a block diagram of a communication system for generating CGS sequence based DMRS Design for pi/2 BPSK Modulation, in accordance with an embodiment of the present disclosure. As shown in FIG. 10, the communication system 1000 comprises a processor 1002, and memory 1004 coupled with the processor 1002. The communication system 1000 may also be referred as a transmitter. The processor 1002 may be configured to perform one or more functions of the communication system 1000 for receiving input and generate waveform for transmitting to a receiver. In one implementation, the communication system 1000 may comprise blocks 1006, also referred as units or modules, for performing various operations in accordance with the embodiments of the present disclosure.

The blocks 1006 includes Pi/2 BPSK mapping unit 1008, precoder unit 1010, a discrete Fourier transform (DFT) unit 1012, a subcarrier mapping unit 1014, an inverse fast Fourier transform (IFFT) unit 1016 and a CP unit 1018. The discrete Fourier transform (DFT) 1012 is hereinafter referred as a DFT unit 104. The IFFT unit 1016 is also referred as an inverse DFT unit.

The Pi/2 BPSK unit 1008 receives an input 1022, which may be a BPSK sequence, which performed Pi/2 BPSK modulation and generated modulated sequence. The precoder 1010 performs precoding on the modulated sequence to generate precoded sequence, which is fed to the DFT unit 1012 which transforms the precoded sequence. The subcarrier mapping unit 1014 performs subcarrier frequency mapping. The mapped sequence is fed to IDFT unit 1016, which is configured to perform an inverse transform of the transformed sequence, to generate a time domain signal. Thereafter the Cyclic prefix (CP) unit performs cyclic prefixing to generate an output, which is having low PAPR. The method performed by the communication system 1000 comprises obtaining a set of computer-generated sequences of desired length with low PAPR and good correlation properties, π/2-BPSK modulation, precoding the π/2-BPSK sequence i.e., spectral shaping followed by modulation of the precoded π/2-BPSK sequence with DFT-s-OFDM with appropriate subcarrier mapping for RS. For PUSCH the RS is comb like structure and for PUCCH it's a full allocation. When the RS uses a comb like structure the power level of non-zero RS subcarriers may be boosted to align with the total power level of the data carrying symbols. In the case of pi/2 BPSK with spectrum shaping, the overall transmission power can be close to the PA saturation power level.

As shown in the FIG. 10, BPSK sequences are modulated using π/2 BPSK and DFT-s-OFDM with proper FDSS. The filter employed above is a two-tap filter with the system function 1−D derived from linearized Gaussian pulse without oversampling (suitable truncation and rounding of coefficients is used). Similarly, a 3-tap filter can be used. In the NR standard (RAN4 specifications) the maximum filter length that carries significant energy is constrained to be 3.

The same FDSS could be used on the DMRS and the PU×CH to allow for accurate channel estimation. In addition, since both the DMRS and data are generated using π/2 BPSK and DFT-s-OFDM, their PAPR are effectively the same.

The following are the sequences of length 6, 12, 18 and 24, provided in the below table, used by the communication system 100:

Table 1.1 contains one set of 30 base sequences of length 6 which possess extremely good auto correlation properties such that inter cell/sector collision specifically on cell edge UEs can be minimized Table 1.2 contains second set of 30 base sequences of length 6 such that circular shifts of base sequences will result in low cross-correlation which can be used in multi UE multiplexing.

Table 2.1 contains one set of 30 base sequences of length 12 which possess extremely good auto correlation properties such that inter cell/sector collision specifically on cell edge UEs can be minimized Table 2.2 contains second set of 30 base sequences of length 12 such that circular shifts of base sequences will result in orthogonal sequences which can be used for multi UE multiplexing.

Table 3.1 contains one set of 30 base sequences of length 18 which possess extremely good auto correlation properties such that inter cell/sector collision specifically on cell edge UEs can be minimized Table 3.2 contains second set of 30 base sequences of length 18 such that circular shifts of base sequences will result in low cross-correlation which can be used in multi UE multiplexing.

Table 4.1 contains one set of 30 base sequences of length 24 which possess extremely good auto correlation properties such that inter cell/sector collision specifically on cell edge UEs can be minimized Table 4.2 contains second set of 30 base sequences of length 24 such that circular shifts of base sequences will result in orthogonal sequences which can be used for multi UE multiplexing.

Table 5.1 (a) contains a third set of 30 sequences for length 12 along with the principle of using cyclic shifts and some sequences without.

Table 5.1 (b) contains another set of length 12 sequences also using principle of cyclic shifts.

Table 5.2 contains a third set of 30 sequences for length 18 along with the principle of using cyclic shifts and some sequences without.

Table 5.3 contains a third set of 30 sequences for length 24 along with the principle of using cyclic shifts and some sequences without.

Table 6.1 contains another set of length-12 CGS BPSK Sequences for $\pi/2$ BPSK DMRS.

Table 6.2 contains another set of length-18 CGS BPSK Sequences for $\pi/2$ BPSK DMRS.

Table 6.3 contains another set of length-24 CGS BPSK Sequences for $\pi/2$ BPSK DMRS.

The sequences 24-29 in Tables 5.1, 5.2 and 5.3 covers the principle of the cyclic shifts in designing the computer generated sequences used for length "X" PRB allocations. Here X is 24, 36 and 48 RE's (i.e., 2, 3 and 4 PRBs) for PUSCH allocation and 1, 2 PRBs for PUCCH.

Better CGS may also be designed using not only binary CGS but also M-ary CGS. Below, the base sequences are shown which have been described using FIG. 10.

Below is a Table 1.1 showing one set of 30 base sequences of length 6 which possess extremely good auto correlation properties such that inter cell/sector collision specifically on cell edge UEs can be minimized. Table 1.1 shows first set of length-6 CGS BPSK Sequences for pi/2 BPSK DMRS:

TABLE 1.1

| Index | Length 6 BPSK sequence | | | | | |
|---|---|---|---|---|---|---|
| 1 | −1 | −1 | −1 | −1 | −1 | 1 |
| 2 | 1 | −1 | −1 | −1 | −1 | −1 |
| 3 | −1 | 1 | −1 | −1 | −1 | −1 |
| 4 | −1 | −1 | 1 | −1 | −1 | −1 |
| 5 | −1 | −1 | −1 | 1 | −1 | −1 |
| 6 | −1 | −1 | −1 | −1 | 1 | −1 |
| 7 | −1 | −1 | −1 | −1 | 1 | 1 |
| 8 | 1 | −1 | −1 | −1 | −1 | 1 |
| 9 | 1 | 1 | −1 | −1 | −1 | −1 |
| 10 | −1 | 1 | 1 | −1 | −1 | −1 |
| 11 | −1 | −1 | 1 | 1 | −1 | −1 |
| 12 | −1 | −1 | −1 | 1 | 1 | −1 |
| 13 | −1 | −1 | 1 | 1 | 1 | 1 |
| 14 | 1 | −1 | −1 | 1 | 1 | 1 |

TABLE 1.1-continued

| Index | Length 6 BPSK sequence | | | | | |
|---|---|---|---|---|---|---|
| 15 | 1 | 1 | −1 | −1 | 1 | 1 |
| 16 | 1 | 1 | 1 | −1 | −1 | 1 |
| 17 | 1 | 1 | 1 | 1 | −1 | −1 |
| 18 | −1 | 1 | 1 | 1 | 1 | −1 |
| 19 | −1 | 1 | 1 | 1 | 1 | 1 |
| 20 | 1 | −1 | 1 | 1 | 1 | 1 |
| 21 | 1 | 1 | −1 | 1 | 1 | 1 |
| 22 | 1 | 1 | 1 | −1 | 1 | 1 |
| 23 | 1 | 1 | 1 | 1 | −1 | 1 |
| 24 | 1 | 1 | 1 | 1 | 1 | −1 |
| 25 | −1 | −1 | 1 | −1 | 1 | −1 |
| 26 | −1 | −1 | −1 | 1 | −1 | 1 |
| 27 | 1 | −1 | −1 | −1 | 1 | −1 |
| 28 | −1 | 1 | −1 | −1 | −1 | 1 |
| 29 | 1 | −1 | 1 | −1 | −1 | −1 |
| 30 | −1 | 1 | −1 | 1 | −1 | −1 |

Table 1.2 shows a second set of 30 base sequences of length 6 such that circular shifts of base sequences will result in low cross-correlation which can be used in multi UE multiplexing.

TABLE 1.2

| Index | Length 6 BPSK sequence | | | | | |
|---|---|---|---|---|---|---|
| 1 | −1 | −1 | −1 | −1 | −1 | 1 |
| 2 | −1 | −1 | −1 | −1 | 1 | −1 |
| 3 | −1 | −1 | −1 | −1 | 1 | 1 |
| 4 | −1 | −1 | −1 | 1 | −1 | −1 |
| 5 | −1 | −1 | −1 | 1 | −1 | 1 |
| 6 | −1 | −1 | −1 | 1 | 1 | −1 |
| 7 | −1 | −1 | 1 | −1 | −1 | −1 |
| 8 | −1 | −1 | 1 | −1 | 1 | −1 |
| 9 | −1 | −1 | 1 | −1 | 1 | 1 |
| 10 | −1 | −1 | 1 | 1 | −1 | −1 |
| 11 | −1 | −1 | 1 | 1 | −1 | 1 |
| 12 | −1 | −1 | 1 | 1 | 1 | 1 |
| 13 | −1 | 1 | −1 | −1 | −1 | −1 |
| 14 | −1 | 1 | −1 | −1 | −1 | 1 |
| 15 | −1 | 1 | −1 | −1 | 1 | 1 |
| 16 | −1 | 1 | −1 | 1 | −1 | −1 |
| 17 | −1 | 1 | −1 | 1 | 1 | 1 |
| 18 | −1 | 1 | 1 | 1 | 1 | 1 |
| 19 | −1 | 1 | 1 | −1 | −1 | −1 |
| 20 | −1 | 1 | 1 | −1 | −1 | 1 |
| 21 | −1 | 1 | 1 | −1 | 1 | 1 |
| 22 | −1 | 1 | 1 | 1 | −1 | 1 |
| 23 | −1 | 1 | 1 | 1 | 1 | −1 |
| 24 | −1 | 1 | 1 | 1 | 1 | 1 |
| 25 | 1 | −1 | −1 | −1 | −1 | −1 |
| 26 | 1 | −1 | −1 | −1 | −1 | 1 |
| 27 | 1 | −1 | −1 | −1 | 1 | −1 |
| 28 | 1 | −1 | −1 | 1 | −1 | 1 |
| 29 | 1 | −1 | −1 | 1 | 1 | 1 |
| 30 | 1 | −1 | −1 | 1 | 1 | 1 |

Table 2.1 shows one set of 30 base sequences of length 12 which possess extremely good auto correlation properties such that inter cell/sector collision specifically on cell edge UEs can be minimized

TABLE 2.1

| Index | Length 12 BPSK Sequence | | | | | | | | | | | |
|---|---|---|---|---|---|---|---|---|---|---|---|---|
| 1 | −1 | 1 | −1 | 1 | −1 | −1 | −1 | −1 | −1 | 1 | 1 | −1 |
| 2 | −1 | −1 | 1 | −1 | 1 | −1 | −1 | −1 | −1 | −1 | 1 | 1 |
| 3 | 1 | −1 | −1 | 1 | −1 | 1 | −1 | −1 | −1 | −1 | −1 | 1 |
| 4 | 1 | 1 | −1 | −1 | 1 | −1 | 1 | −1 | −1 | −1 | −1 | −1 |
| 5 | −1 | 1 | 1 | −1 | −1 | 1 | −1 | 1 | −1 | −1 | −1 | −1 |
| 6 | −1 | −1 | 1 | 1 | −1 | −1 | 1 | −1 | 1 | −1 | −1 | −1 |
| 7 | 1 | −1 | 1 | 1 | −1 | 1 | 1 | 1 | 1 | −1 | 1 | 1 |
| 8 | 1 | 1 | −1 | 1 | −1 | 1 | 1 | 1 | 1 | 1 | −1 | −1 |

TABLE 2.1-continued

| Index | Length 12 BPSK Sequence |
|---|---|
| 9  | -1  1  1 -1  1 -1  1  1  1  1  1 -1 |
| 10 | -1 -1  1  1 -1  1 -1  1  1  1  1  1 |
| 11 |  1 -1 -1  1  1 -1  1 -1  1  1  1  1 |
| 12 |  1  1 -1 -1  1  1 -1  1 -1  1  1  1 |
| 13 | -1  1 -1  1  1  1  1  1 -1 -1  1  1 |
| 14 |  1 -1  1 -1  1  1  1  1  1 -1 -1  1 |
| 15 |  1  1 -1  1 -1  1  1  1  1  1 -1 -1 |
| 16 | -1  1  1 -1  1 -1  1  1  1  1  1 -1 |
| 17 | -1 -1  1  1 -1  1 -1  1  1  1  1  1 |
| 18 |  1 -1 -1  1  1 -1  1 -1  1  1  1  1 |
| 19 |  1  1 -1 -1 -1 -1 -1 -1  1  1 -1 -1 |
| 20 | -1  1 -1  1 -1 -1 -1 -1 -1  1  1 -1 |
| 21 | -1 -1  1 -1  1 -1 -1 -1 -1 -1  1  1 |
| 22 |  1 -1 -1  1 -1  1 -1 -1 -1 -1 -1  1 |
| 23 |  1  1 -1 -1  1 -1  1 -1 -1 -1 -1 -1 |
| 24 | -1  1  1 -1 -1  1 -1  1 -1 -1 -1 -1 |
| 25 | -1  1 -1  1  1 -1 -1  1  1  1  1  1 |
| 26 |  1 -1  1 -1  1  1 -1 -1  1  1  1  1 |
| 27 |  1  1 -1  1 -1  1  1 -1 -1  1  1  1 |
| 28 |  1  1  1 -1  1 -1  1  1 -1 -1  1  1 |
| 29 |  1  1  1  1 -1  1 -1  1  1 -1 -1  1 |
| 30 |  1  1  1  1  1 -1  1 -1  1  1 -1 -1 |

Table 2.2 shows a second set of 30 base sequences of length 12 such that circular shifts of base sequences will result in orthogonal sequences which can be used for multi UE multiplexing.

TABLE 2.2

| Index | Length 12 BPSK Sequence |
|---|---|
| 1  | -1 -1 -1 -1 -1  1 -1  1 -1 -1  1  1 |
| 2  | -1 -1 -1 -1 -1  1  1 -1 -1  1 -1  1 |
| 3  | -1 -1 -1 -1  1 -1 -1 -1  1 -1  1  1 |
| 4  | -1 -1 -1 -1  1 -1 -1  1  1  1 -1  1 |
| 5  | -1 -1 -1 -1  1 -1  1 -1 -1  1  1 -1 |
| 6  | -1 -1 -1 -1  1 -1  1  1 -1  1 -1  1 |
| 7  | -1 -1 -1 -1  1  1 -1 -1  1 -1  1 -1 |
| 8  | -1 -1 -1 -1  1  1  1 -1 -1 -1 -1  1 |
| 9  | -1 -1 -1  1 -1 -1 -1 -1  1  1 -1  1 |
| 10 | -1 -1 -1  1 -1 -1 -1  1 -1  1  1 -1 |
| 11 | -1 -1 -1  1 -1 -1  1  1  1 -1  1  1 |
| 12 | -1 -1 -1  1 -1  1 -1 -1  1  1 -1  1 |
| 13 | -1 -1 -1  1  1  1 -1 -1 -1 -1  1  1 |
| 14 | -1 -1 -1  1 -1  1  1  1 -1 -1  1 -1 |
| 15 | -1 -1 -1  1 -1  1  1  1  1 -1 -1  1 |
| 16 | -1 -1 -1  1  1 -1 -1  1  1 -1 -1 -1 |
| 17 | -1 -1 -1  1  1 -1  1 -1 -1 -1  1 -1 |
| 18 | -1 -1 -1  1  1 -1  1  1  1  1 -1 -1 |
| 19 | -1 -1  1 -1 -1 -1 -1  1 -1  1  1  1 |
| 20 | -1 -1  1 -1 -1 -1  1  1 -1  1 -1  1 |
| 21 | -1 -1  1 -1  1 -1 -1  1  1 -1  1 -1 |
| 22 | -1 -1  1 -1  1  1  1 -1  1  1 -1  1 |
| 23 | -1 -1  1  1 -1  1 -1 -1 -1 -1  1  1 |
| 24 | -1 -1  1  1 -1  1  1  1 -1  1 -1 -1 |
| 25 | -1 -1  1 -1  1  1 -1 -1 -1 -1  1  1 |
| 26 | -1 -1  1 -1  1  1  1 -1  1 -1  1  1 |
| 27 | -1 -1  1 -1  1  1  1 -1  1  1  1  1 |
| 28 | -1 -1  1 -1  1  1  1  1 -1  1  1  1 |
| 29 | -1 -1  1  1 -1 -1 -1 -1 -1  1 -1  1 |
| 30 | -1 -1  1  1 -1 -1  1 -1  1 -1 -1 -1 |

Table 3.1 shows one set of 30 base sequences of length 18 which possess extremely good auto correlation properties such that inter cell/sector collision specifically on cell edge UEs can be minimized.

TABLE 3.1

| Index | Length 18 BPSK sequences |
|---|---|
| 1  | -1 -1 -1 -1 -1 -1 -1  1  1 -1  1 -1  1 -1 -1  1  1 -1 |
| 2  | -1 -1 -1 -1 -1 -1 -1  1  1 -1  1 -1  1 -1 -1  1  1  1 |
| 3  |  1 -1 -1 -1 -1 -1 -1 -1  1  1 -1  1 -1  1 -1 -1  1  1 |
| 4  |  1  1 -1 -1 -1 -1 -1 -1 -1  1  1 -1  1 -1  1 -1 -1 -1 |
| 5  | -1  1  1 -1 -1 -1 -1 -1 -1 -1  1  1 -1  1 -1  1 -1 -1 |
| 6  | -1 -1  1  1 -1 -1 -1 -1 -1 -1 -1  1  1 -1  1 -1  1 -1 |
| 7  |  1 -1 -1  1  1 -1 -1 -1 -1 -1 -1 -1  1  1 -1  1 -1  1 |
| 8  | -1  1 -1 -1  1  1 -1 -1 -1 -1 -1 -1 -1  1  1 -1  1 -1 |
| 9  |  1 -1  1 -1 -1  1  1 -1 -1 -1 -1 -1 -1 -1  1  1 -1  1 |
| 10 | -1 -1 -1 -1 -1  1  1 -1 -1  1  1 -1  1 -1 -1  1  1 -1 |
| 11 | -1 -1 -1 -1 -1 -1  1  1 -1 -1  1  1 -1  1 -1 -1  1  1 |
| 12 |  1 -1 -1 -1 -1 -1 -1  1  1 -1 -1  1  1 -1  1 -1 -1  1 |
| 13 |  1  1 -1 -1 -1 -1 -1 -1  1  1 -1 -1  1  1 -1  1 -1 -1 |
| 14 | -1  1  1 -1 -1 -1 -1 -1 -1  1  1 -1 -1  1  1 -1  1 -1 |
| 15 |  1 -1  1  1 -1 -1 -1 -1 -1 -1  1  1 -1 -1  1  1 -1  1 |
| 16 | -1  1 -1  1  1 -1 -1 -1 -1 -1 -1  1  1 -1 -1  1  1 -1 |
| 17 |  1 -1  1 -1  1  1 -1 -1 -1 -1 -1 -1  1  1 -1 -1  1  1 |
| 18 | -1  1 -1  1 -1  1  1 -1 -1 -1 -1 -1 -1  1  1 -1 -1  1 |
| 19 | -1 -1 -1 -1 -1 -1 -1  1  1 -1  1 -1  1 -1 -1  1  1 -1 |
| 20 |  1 -1 -1 -1 -1 -1 -1 -1  1  1 -1  1 -1  1 -1 -1  1  1 |
| 21 |  1  1 -1 -1 -1 -1 -1 -1 -1  1  1 -1  1 -1  1 -1 -1  1 |
| 22 | -1  1  1 -1 -1 -1 -1 -1 -1 -1  1  1 -1  1 -1  1 -1 -1 |
| 23 | -1 -1  1  1 -1 -1 -1 -1 -1 -1 -1  1  1 -1  1 -1  1 -1 |
| 24 |  1 -1 -1  1  1 -1 -1 -1 -1 -1 -1 -1  1  1 -1  1 -1  1 |
| 25 | -1  1 -1 -1  1  1 -1 -1 -1 -1 -1 -1 -1  1  1 -1  1 -1 |
| 26 |  1 -1  1 -1 -1  1  1 -1 -1 -1 -1 -1 -1 -1  1  1 -1  1 |
| 27 | -1  1 -1  1 -1 -1  1  1 -1 -1 -1 -1 -1 -1 -1  1  1 -1 |
| 28 | -1 -1  1 -1  1 -1 -1  1  1 -1 -1 -1 -1 -1 -1 -1  1  1 |
| 29 | -1 -1 -1 -1 -1 -1 -1  1  1 -1  1 -1  1 -1 -1  1  1 -1 |
| 30 |  1  1 -1 -1 -1 -1 -1 -1 -1  1  1 -1  1 -1  1 -1 -1 -1 |

Table 3.2 shows a second set of 30 base sequences of length 18 such that circular shifts of base sequences will result in low cross-correlation which can be used in multi UE multiplexing.

TABLE 3.2

| Index | Length 18 BPSK sequences |
|---|---|
| 1  | -1 -1 -1 -1 -1 -1 -1 -1  1  1 -1 -1  1 -1  1 -1  1  1 |
| 2  | -1 -1 -1 -1 -1 -1 -1 -1  1  1 -1  1 -1  1 -1 -1  1  1 |
| 3  | -1 -1 -1 -1 -1 -1 -1  1 -1  1 -1 -1 -1  1  1 -1  1  1 |
| 4  | -1 -1 -1 -1 -1 -1 -1  1 -1  1  1 -1 -1  1  1  1 -1  1 |
| 5  | -1 -1 -1 -1 -1 -1  1 -1  1  1 -1  1 -1 -1 -1  1  1  1 |
| 6  | -1 -1 -1 -1 -1 -1  1 -1  1  1  1 -1 -1  1 -1  1  1  1 |
| 7  | -1 -1 -1 -1 -1 -1  1 -1  1  1  1 -1 -1  1  1 -1  1  1 |
| 8  | -1 -1 -1 -1 -1 -1  1  1 -1 -1 -1  1 -1  1  1 -1  1  1 |
| 9  | -1 -1 -1 -1 -1 -1  1  1 -1 -1  1 -1  1  1  1 -1  1  1 |
| 10 | -1 -1 -1 -1 -1 -1  1  1 -1 -1  1 -1  1 -1  1  1  1 -1 |
| 11 | -1 -1 -1 -1 -1 -1  1  1 -1  1 -1 -1  1  1  1 -1  1  1 |
| 12 | -1 -1 -1 -1 -1 -1  1  1 -1  1 -1  1  1 -1 -1  1  1  1 |
| 13 | -1 -1 -1 -1 -1 -1  1  1 -1  1 -1  1 -1 -1  1  1  1 -1 |
| 14 | -1 -1 -1 -1 -1 -1  1  1 -1  1  1 -1 -1 -1  1  1 -1  1 |
| 15 | -1 -1 -1 -1 -1 -1  1 -1 -1 -1  1 -1  1 -1 -1  1  1  1 |
| 16 | -1 -1 -1 -1 -1 -1  1 -1 -1 -1  1  1 -1  1 -1  1  1  1 |
| 17 | -1 -1 -1 -1 -1 -1  1 -1 -1  1  1  1 -1  1 -1  1 -1  1 |
| 18 | -1 -1 -1 -1 -1 -1  1 -1 -1  1  1 -1  1  1  1 -1  1  1 |
| 19 | -1 -1 -1 -1 -1 -1  1 -1  1 -1 -1 -1  1  1  1 -1  1  1 |
| 20 | -1 -1 -1 -1 -1 -1  1 -1  1 -1  1  1 -1 -1 -1  1  1  1 |
| 21 | -1 -1 -1 -1 -1 -1  1 -1  1 -1  1  1 -1  1 -1 -1  1  1 |
| 22 | -1 -1 -1 -1 -1 -1  1 -1  1 -1  1 -1  1  1 -1 -1 -1  1 |
| 23 | -1 -1 -1 -1 -1 -1  1 -1 -1  1 -1  1  1  1 -1 -1  1  1 |
| 24 | -1 -1 -1 -1 -1 -1  1 -1 -1  1  1 -1 -1 -1  1  1 -1  1 |
| 25 | -1 -1 -1 -1 -1 -1  1 -1 -1  1  1 -1  1 -1 -1 -1  1  1 |
| 26 | -1 -1 -1 -1 -1 -1  1 -1 -1  1  1 -1  1 -1  1 -1  1  1 |
| 27 | -1 -1 -1 -1 -1 -1  1 -1 -1  1  1 -1  1 -1  1  1  1  1 |
| 28 | -1 -1 -1 -1 -1 -1  1 -1 -1  1  1  1 -1 -1 -1  1 -1  1 |
| 29 | -1 -1 -1 -1 -1 -1  1 -1 -1  1  1  1 -1 -1  1 -1  1  1 |
| 30 | -1 -1 -1 -1 -1 -1  1 -1  1  1  1 -1 -1  1  1 -1  1 |

Table 4.1 shows one set of 30 base sequences of length 24 which possess extremely good auto correlation properties such that inter cell/sector collision specifically on cell edge UEs can be minimized.

TABLE 4.1

| Index | Length 24 BPSK sequences |
|---|---|
| 1  | -1 -1  1  1 -1 -1 -1 -1  1 -1  1 -1  1  1 -1 -1  1  1  1  1  1  1 -1  1 |
| 2  |  1 -1 -1  1  1 -1 -1 -1 -1  1 -1  1 -1  1  1 -1 -1  1  1  1  1  1  1 -1 |
| 3  | -1  1 -1 -1  1  1 -1 -1 -1  1 -1  1 -1  1  1 -1 -1  1  1  1  1  1  1  1 |
| 4  |  1 -1  1 -1 -1  1  1 -1 -1 -1 -1  1 -1  1 -1  1  1 -1 -1  1  1  1  1  1 |
| 5  |  1  1 -1  1 -1 -1  1  1 -1 -1 -1 -1  1 -1  1 -1  1  1 -1 -1  1  1  1  1 |
| 6  |  1  1  1 -1  1 -1 -1  1  1 -1 -1 -1 -1  1 -1  1 -1  1  1 -1 -1  1  1  1 |
| 7  |  1  1  1  1 -1  1 -1 -1  1  1 -1 -1 -1 -1  1 -1  1 -1  1  1 -1 -1  1  1 |
| 8  |  1  1  1  1  1 -1  1 -1 -1  1  1 -1 -1 -1 -1  1 -1  1 -1  1  1 -1 -1  1 |
| 9  |  1  1  1  1  1  1 -1  1 -1 -1  1  1 -1 -1 -1 -1  1 -1  1 -1  1  1 -1 -1 |
| 10 | -1  1  1  1  1  1  1 -1  1 -1 -1  1  1 -1 -1 -1 -1  1 -1  1 -1  1  1 -1 |
| 11 | -1 -1  1  1  1  1  1  1 -1  1 -1 -1  1  1 -1 -1 -1 -1  1 -1  1 -1  1  1 |
| 12 |  1 -1 -1  1  1  1  1  1  1 -1  1 -1 -1  1  1 -1 -1 -1 -1  1 -1  1 -1  1 |
| 13 | -1  1 -1  1  1  1  1  1  1 -1  1 -1 -1  1  1 -1 -1 -1 -1  1 -1  1  1 -1 |
| 14 | -1 -1  1 -1  1  1  1  1  1  1 -1  1 -1 -1  1  1 -1 -1 -1 -1  1 -1  1  1 |
| 15 |  1 -1 -1  1 -1  1  1  1  1  1  1 -1  1 -1 -1  1  1 -1 -1 -1 -1  1 -1  1 |
| 16 |  1  1 -1 -1  1 -1  1  1  1  1  1  1 -1  1 -1 -1  1  1 -1 -1 -1 -1  1 -1 |
| 17 | -1  1  1 -1 -1  1 -1  1  1  1  1  1  1 -1  1 -1 -1  1  1 -1 -1 -1 -1  1 |
| 18 | -1 -1  1  1 -1 -1  1 -1  1  1  1  1  1  1 -1  1 -1 -1  1  1 -1 -1 -1 -1 |
| 19 | -1 -1 -1  1  1 -1  1 -1  1  1  1  1  1  1 -1  1 -1  1  1 -1  1 -1  1 -1 |
| 20 | -1 -1 -1 -1  1  1 -1  1 -1  1  1  1  1  1  1 -1  1 -1 -1  1  1 -1 -1  1 |
| 21 |  1 -1 -1 -1 -1  1  1 -1  1 -1  1  1  1  1  1  1 -1  1 -1 -1  1  1 -1 -1 |
| 22 | -1  1 -1 -1 -1 -1  1  1 -1  1 -1  1  1  1  1  1  1 -1  1 -1 -1  1  1 -1 |
| 23 |  1 -1  1 -1 -1 -1 -1  1  1 -1  1 -1  1  1  1  1  1  1 -1  1 -1 -1  1 -1 |
| 24 | -1  1 -1  1 -1 -1 -1 -1  1  1 -1  1 -1  1  1  1  1  1  1 -1  1 -1 -1  1 |
| 25 |  1 -1  1 -1  1 -1 -1 -1 -1  1  1 -1  1 -1  1  1  1  1  1  1 -1  1 -1  1 |
| 26 |  1  1 -1  1 -1  1 -1 -1 -1 -1  1  1 -1  1 -1  1  1  1  1  1  1 -1  1 -1 |
| 27 |  1  1  1 -1  1 -1  1 -1 -1 -1 -1  1  1 -1  1 -1  1  1  1  1  1  1 -1 -1 |
| 28 | -1  1  1  1 -1  1 -1  1 -1 -1 -1 -1  1  1 -1  1 -1  1  1  1  1  1  1 -1 |
| 29 | -1 -1  1  1  1 -1  1 -1  1 -1 -1 -1 -1  1  1 -1  1 -1  1  1  1  1  1  1 |
| 30 |  1 -1 -1  1  1  1 -1  1 -1  1 -1 -1 -1 -1  1  1 -1  1 -1  1  1  1  1  1 |

Table 4.2 shows a second set of 30 base sequences of length 24 such that circular shifts of base sequences will result in orthogonal sequences which can be used for multi UE multiplexing.

TABLE 4.2

| Index | Length 24 BPSK sequences |
|---|---|
| 1  | −1 −1 −1 −1 −1 −1  1 −1  1  1 −1 −1  1  1  1  1 −1  1 −1  1 −1 −1  1  1 |
| 2  | −1 −1 −1 −1 −1 −1  1  1 −1 −1  1 −1  1 −1  1  1  1  1 −1 −1  1  1 −1  1 |
| 3  | −1 −1 −1 −1 −1  1 −1 −1  1 −1 −1 −1  1  1 −1  1 −1  1 −1  1 −1  1  1  1 |
| 4  | −1 −1 −1 −1 −1  1 −1  1  1 −1 −1  1  1  1  1 −1  1 −1  1 −1 −1  1  1 −1 |
| 5  | −1 −1 −1 −1 −1  1  1 −1 −1  1 −1  1 −1  1  1  1  1 −1 −1  1  1 −1  1 −1 |
| 6  | −1 −1 −1 −1 −1  1  1  1 −1  1  1 −1 −1  1  1  1 −1 −1 −1  1 −1 −1 −1  1 |
| 7  | −1 −1 −1 −1  1 −1 −1  1 −1 −1 −1  1  1  1 −1  1 −1  1  1 −1  1  1  1 −1 |
| 8  | −1 −1 −1 −1  1 −1  1  1  1 −1 −1  1  1  1  1  1  1 −1  1 −1 −1 −1  1  1 |
| 9  | −1 −1 −1 −1  1  1 −1  1 −1  1  1  1 −1  1 −1  1 −1 −1  1  1  1 −1  1 −1 |
| 10 | −1 −1 −1 −1  1  1 −1 −1  1 −1  1  1  1  1  1 −1 −1  1  1 −1  1 −1  1 −1 |
| 11 | −1 −1 −1 −1  1  1 −1 −1  1  1  1  1  1  1  1 −1 −1  1 −1  1 −1  1 −1  1 |
| 12 | −1 −1 −1 −1  1  1  1 −1  1  1  1 −1  1  1 −1 −1  1  1 −1  1 −1 −1  1  1 |
| 13 | −1 −1 −1  1 −1 −1  1 −1 −1 −1 −1  1  1 −1  1  1 −1  1 −1  1  1  1  1  1 |
| 14 | −1 −1 −1  1 −1 −1  1 −1 −1 −1  1  1 −1  1 −1  1  1 −1  1  1  1  1 −1 −1 |
| 15 | −1 −1 −1  1 −1 −1  1 −1  1 −1 −1 −1  1  1 −1  1  1 −1  1  1  1  1  1  1 |
| 16 | −1 −1 −1  1 −1  1 −1 −1  1 −1 −1 −1  1  1  1  1  1  1 −1  1  1  1  1  1 |
| 17 | −1 −1 −1  1 −1  1  1 −1 −1  1 −1 −1  1  1  1  1 −1  1 −1  1 −1  1  1 −1 |
| 18 | −1 −1 −1  1 −1  1  1 −1 −1  1  1  1  1 −1  1 −1  1 −1 −1  1  1 −1 −1 −1 |
| 19 | −1 −1 −1  1  1 −1 −1  1 −1  1 −1  1  1  1  1 −1 −1  1 −1  1 −1 −1 −1 −1 |
| 20 | −1 −1 −1  1  1 −1 −1  1 −1  1  1  1  1  1  1 −1 −1  1  1 −1  1 −1  1  1 |
| 21 | −1 −1 −1  1  1  1 −1  1 −1  1  1 −1  1  1 −1 −1 −1  1 −1  1 −1  1 −1  1 |
| 22 | −1 −1 −1  1  1  1 −1  1  1 −1  1 −1  1  1 −1 −1 −1  1 −1  1  1 −1  1 −1 |
| 23 | −1 −1 −1  1  1  1  1 −1  1 −1  1  1  1  1 −1 −1 −1  1 −1  1  1 −1  1  1 |
| 24 | −1 −1 −1  1  1  1  1  1 −1  1  1  1  1 −1 −1 −1  1 −1 −1  1  1 −1  1  1 |
| 25 | −1 −1  1 −1 −1 −1 −1 −1  1  1 −1  1 −1  1 −1  1  1  1 −1  1 −1 −1  1  1 |
| 26 | −1 −1  1 −1 −1 −1  1  1  1 −1  1  1 −1  1  1 −1 −1 −1 −1 −1  1  1  1  1 |
| 27 | −1 −1  1 −1 −1 −1  1  1  1  1 −1  1  1 −1  1  1 −1 −1 −1  1 −1  1 −1  1 |
| 28 | −1 −1  1 −1  1  1 −1 −1 −1 −1  1  1  1 −1  1 −1  1 −1  1  1  1  1  1 −1 |
| 29 | −1 −1  1 −1 −1  1 −1 −1 −1 −1  1  1 −1  1  1  1  1  1  1  1 −1 −1 −1  1 |
| 30 | −1 −1  1 −1 −1  1  1 −1 −1 −1  1  1 −1  1  1 −1  1  1  1  1  1  1  1 −1 |

TABLE 5.1(a)

| Index | b(0), . . . , b(11) |
|---|---|
| 0  | 0 1 1 1 1 1 1 0 0 0 1 1 |
| 1  | 0 1 1 0 1 0 1 0 0 0 1 1 |
| 2  | 0 1 0 1 1 1 0 1 1 0 1 1 |
| 3  | 0 1 0 0 0 1 1 1 1 0 1 1 |
| 4  | 0 1 1 0 1 0 1 1 1 0 1 1 |
| 5  | 0 1 1 1 0 1 1 1 0 1 1 1 |
| 6  | 0 0 1 0 0 1 1 1 1 1 1 1 |
| 7  | 0 0 0 1 1 1 1 1 0 0 0 1 |
| 8  | 1 0 0 0 1 0 0 0 1 1 1 1 |
| 9  | 1 0 0 0 1 0 0 0 0 0 1 1 |
| 10 | 1 0 0 1 0 0 1 1 1 1 1 1 |
| 11 | 0 1 1 0 0 0 0 0 1 1 0 1 |
| 12 | 0 0 0 0 0 1 1 0 0 0 1 1 |
| 13 | 0 0 0 1 0 0 1 1 1 0 0 1 |
| 14 | 0 0 0 1 0 0 1 0 0 1 1 1 |
| 15 | 1 1 0 0 0 0 0 1 1 1 1 0 |
| 16 | 0 1 0 0 0 1 1 0 1 0 1 1 |
| 17 | 1 1 0 1 0 1 1 0 0 0 1 0 |
| 18 | 1 0 1 0 1 1 0 1 1 0 1 0 |
| 19 | 1 0 1 0 0 1 0 0 1 0 1 0 |
| 20 | 1 0 1 1 0 0 0 1 0 0 0 1 |
| 21 | 1 0 1 0 1 1 0 0 1 0 0 1 |
| 22 | 1 0 1 0 0 0 1 0 0 0 0 0 |
| 23 | 1 1 1 1 0 1 1 1 0 1 0 1 |
| 24 | 0 0 0 1 0 0 0 0 1 0 1 1 |
| 25 | 0 1 1 0 0 0 1 0 0 0 0 1 |
| 26 | 0 0 0 0 1 0 0 0 1 1 0 1 |
| 27 | 1 0 1 0 0 0 0 1 0 0 0 1 |
| 28 | 0 0 0 1 0 0 0 1 1 1 1 0 |
| 29 | 1 1 0 0 0 0 1 0 0 0 1 1 |

TABLE 5.1 (b)

the left column indicates the sequence number.

| Index | b(0), . . . , b(11) |
|---|---|
| 1  | 0 0 0 0 0 0 0 1 1 0 1 1 |
| 2  | 0 0 0 0 0 0 1 1 0 1 1 0 |
| 3  | 0 0 0 0 0 1 1 0 1 1 0 0 |
| 4  | 0 0 0 0 0 1 1 1 0 1 1 1 |
| 5  | 0 0 0 0 1 1 0 1 1 0 0 0 |
| 6  | 0 0 0 0 1 1 1 0 1 1 1 0 |
| 7  | 0 0 0 1 0 0 0 1 1 1 1 1 |
| 8  | 0 0 0 1 0 0 1 0 1 0 0 1 |
| 9  | 0 0 0 1 1 0 1 0 1 0 1 1 |
| 10 | 0 0 0 1 1 0 1 1 0 0 0 0 |
| 11 | 0 0 0 1 1 1 0 1 1 1 0 0 |
| 12 | 0 0 0 1 1 1 1 1 0 0 0 1 |
| 13 | 0 0 1 0 0 0 1 0 0 1 0 1 |
| 14 | 0 0 1 0 0 0 1 1 1 1 1 0 |
| 15 | 0 0 1 0 0 1 0 1 0 0 1 0 |
| 16 | 0 0 1 0 0 1 1 1 1 1 1 1 |
| 17 | 0 0 1 0 1 0 0 1 0 0 0 1 |
| 18 | 0 0 1 0 1 0 1 0 0 1 1 1 |
| 19 | 0 0 1 1 0 1 1 0 0 0 0 0 |
| 20 | 0 0 1 1 1 0 0 1 0 1 0 1 |
| 21 | 0 0 1 1 1 1 1 1 1 0 0 1 |
| 22 | 0 1 0 0 0 1 0 0 1 0 1 0 |
| 23 | 0 1 0 0 1 0 0 0 1 0 0 1 |
| 24 | 0 1 0 0 1 0 1 0 0 1 0 0 |
| 25 | 0 1 0 0 1 1 1 0 0 1 0 1 |
| 26 | 0 1 0 0 1 1 1 1 1 1 1 0 |
| 27 | 0 1 0 1 0 0 1 0 0 0 1 0 |
| 28 | 0 1 0 1 0 0 1 1 1 0 0 1 |
| 29 | 0 1 0 1 0 1 0 0 1 1 1 0 |
| 30 | 0 1 0 1 0 1 1 0 0 0 1 1 |

TABLE 5.2

| Index | b(0), ..., b(17) |
|---|---|
| 0 | 0 1 1 0 1 1 1 0 0 0 0 0 0 0 1 1 0 0 |
| 1 | 0 0 0 1 1 1 1 1 1 0 1 1 0 0 0 1 1 0 0 |
| 2 | 0 0 0 1 1 1 0 1 1 0 0 0 0 0 1 1 0 0 |
| 3 | 0 1 1 0 0 0 0 0 0 0 1 1 1 0 1 1 0 0 |
| 4 | 0 1 1 1 0 1 0 1 1 0 0 0 0 0 1 1 0 0 |
| 5 | 0 0 0 1 1 0 0 1 0 1 0 1 0 0 1 1 0 0 |
| 6 | 0 0 0 1 0 0 1 0 0 1 0 0 0 1 1 1 1 1 |
| 7 | 0 0 1 0 1 0 1 0 0 1 1 0 0 0 0 0 1 1 |
| 8 | 1 1 0 0 1 0 1 1 1 0 1 0 0 1 1 1 0 1 |
| 9 | 1 1 1 1 0 0 0 0 1 0 0 0 1 0 0 0 0 1 |
| 10 | 1 1 1 0 0 0 0 0 1 0 0 0 1 0 0 0 1 1 |
| 11 | 1 0 1 1 1 0 0 0 1 1 1 0 1 1 0 1 0 1 |
| 12 | 1 0 1 1 0 1 0 1 1 1 0 0 0 0 0 1 1 0 |
| 13 | 1 1 0 0 1 0 1 1 0 1 1 0 1 0 0 1 0 1 |
| 14 | 0 0 0 0 0 1 1 1 0 1 1 0 0 0 0 1 0 0 |
| 15 | 0 0 1 1 1 0 1 1 0 1 0 0 0 1 1 0 1 0 |
| 16 | 1 1 1 0 1 0 1 1 0 1 0 0 0 0 0 1 1 0 |
| 17 | 0 1 0 0 1 0 0 0 1 1 1 0 1 0 0 1 1 1 |
| 18 | 1 0 0 0 1 0 1 0 1 0 0 0 1 1 0 1 0 1 |
| 19 | 1 0 1 1 1 0 0 1 0 1 0 0 1 1 1 0 1 0 |
| 20 | 1 1 1 1 0 0 0 1 1 0 1 1 1 0 1 0 0 0 |
| 21 | 1 0 0 1 1 1 0 0 0 0 1 1 1 0 1 0 0 0 |
| 22 | 1 0 0 0 0 1 1 1 0 0 1 0 0 0 1 0 1 1 |
| 23 | 1 0 0 0 0 1 1 1 0 1 0 0 0 1 0 0 1 1 |
| 24 | 0 0 0 0 0 0 0 0 0 1 0 0 1 0 0 1 1 1 |
| 25 | 0 1 0 0 1 0 0 1 1 1 0 0 0 0 0 0 0 0 |
| 26 | 1 1 0 1 1 0 1 0 0 1 0 0 1 0 0 0 0 0 |
| 27 | 0 0 0 0 0 0 0 1 1 0 0 0 1 0 1 1 1 0 |
| 28 | 1 0 0 0 1 0 1 1 1 0 0 0 0 0 0 0 0 1 |
| 29 | 1 1 1 0 0 0 0 0 0 0 0 1 1 0 0 0 1 0 |

TABLE 5.3

| Index | b(0), ..., b(23) |
|---|---|
| 0 | 0 1 0 1 1 0 1 0 1 0 1 0 1 1 0 1 1 0 0 1 0 0 1 1 |
| 1 | 0 1 0 0 0 1 1 0 1 0 1 0 1 1 1 0 1 0 0 1 0 0 1 1 |
| 2 | 0 1 0 0 1 0 0 1 1 1 1 1 1 1 1 1 1 0 0 1 0 0 1 1 |
| 3 | 0 1 1 0 1 0 1 1 0 1 1 0 0 1 0 1 0 1 0 0 1 0 0 1 1 |
| 4 | 0 1 0 1 0 1 0 1 1 0 0 1 0 0 1 0 1 0 0 1 0 0 1 1 |
| 5 | 0 0 0 0 1 0 1 0 0 1 0 1 0 1 0 1 1 0 0 1 0 0 1 1 |
| 6 | 1 1 0 0 1 0 1 0 0 0 0 1 1 0 0 0 1 0 0 0 1 1 1 1 |
| 7 | 0 1 0 0 1 1 1 1 1 1 1 0 0 0 1 0 0 0 1 0 0 0 0 1 |
| 8 | 0 1 1 0 0 1 0 1 1 1 1 0 0 0 0 0 0 1 1 0 1 0 1 1 1 |
| 9 | 0 1 1 1 0 0 0 1 0 1 0 0 1 0 1 1 1 0 0 1 0 0 0 1 |
| 10 | 1 1 0 0 1 0 0 0 0 1 0 1 1 1 0 1 0 0 1 0 0 0 0 0 1 |
| 11 | 1 1 1 1 0 1 1 0 0 0 0 0 0 0 1 0 0 1 0 0 0 0 0 1 |
| 12 | 0 1 0 0 0 1 1 0 1 1 0 0 1 0 1 1 0 0 0 1 1 0 1 0 |
| 13 | 1 0 0 1 0 1 0 0 1 1 0 0 0 0 1 1 1 1 1 1 1 0 0 1 |
| 14 | 1 0 0 1 0 1 0 0 1 1 0 1 1 0 0 1 1 0 0 0 0 0 1 1 |
| 15 | 0 0 0 1 1 1 1 1 0 0 1 0 1 0 0 1 1 1 0 1 1 1 0 0 1 |
| 16 | 1 1 1 0 1 0 1 1 1 0 0 1 1 1 0 0 0 0 0 0 1 1 0 1 0 |
| 17 | 1 0 1 1 0 1 1 0 0 0 1 0 1 1 0 1 0 0 1 0 0 0 0 1 |

TABLE 5.3-continued

| Index | b(0), ..., b(23) |
|---|---|
| 18 | 1 1 1 1 1 0 0 1 0 0 0 1 1 1 1 0 1 1 1 1 1 1 0 0 |
| 19 | 1 1 1 1 0 1 0 0 1 1 0 0 0 0 1 1 0 0 0 0 0 0 0 1 |
| 20 | 1 0 1 0 0 0 1 1 1 0 1 1 0 1 0 1 1 0 1 1 1 1 0 0 |
| 21 | 1 0 1 0 1 1 1 0 0 0 1 0 0 1 0 1 0 0 1 0 0 0 1 1 |
| 22 | 1 1 1 1 0 0 1 0 0 0 1 1 1 1 1 0 0 1 1 1 0 1 0 1 |
| 23 | 1 0 1 1 0 1 1 0 0 0 1 0 0 0 0 0 1 0 0 1 1 1 1 0 |
| 24 | 0 0 0 0 0 0 0 1 1 0 0 0 1 1 1 1 1 1 1 0 0 0 1 1 |
| 25 | 1 1 1 1 0 0 0 1 1 0 0 0 0 0 0 0 1 1 0 0 1 1 1 1 |
| 26 | 0 0 0 0 0 0 0 1 1 1 0 0 1 1 1 1 1 1 1 0 0 1 1 1 0 |
| 27 | 1 1 0 0 1 1 1 0 0 0 0 0 0 0 1 1 1 0 0 1 1 1 1 1 |
| 28 | 0 0 0 0 1 0 0 0 0 1 0 0 1 1 1 1 0 1 1 1 1 0 0 1 |
| 29 | 0 1 1 1 1 0 0 1 0 0 0 0 1 0 0 0 0 1 0 0 1 1 1 1 |

Table 5.4 shows set of length 12 BPSK sequences for π/2 BPSK DMRS:

TABLE 5.4

| Index | b(0), ..., b(11) |
|---|---|
| 0 | 0 0 0 0 0 0 1 1 0 1 1 0 |
| 1 | 0 0 0 0 0 1 0 0 0 1 1 1 |
| 2 | 0 0 0 0 1 1 1 0 1 1 1 |
| 3 | 1 1 0 1 1 0 1 0 1 0 0 0 |
| 4 | 1 1 0 0 1 0 1 0 0 0 1 |
| 5 | 1 0 1 1 0 1 0 0 1 0 1 1 |
| 6 | 0 0 0 1 0 1 0 0 0 1 0 |
| 7 | 0 1 0 0 0 1 0 0 1 0 0 0 |
| 8 | 1 0 1 1 1 0 1 1 0 1 1 |
| 9 | 1 0 1 1 0 1 1 1 1 0 0 |
| 10 | 1 0 1 0 1 0 1 0 0 1 1 0 |
| 11 | 1 0 1 0 0 1 0 0 1 0 1 0 |
| 12 | 1 1 0 0 0 0 1 1 1 1 0 |
| 13 | 0 1 0 0 0 1 1 1 0 1 1 |
| 14 | 0 0 0 0 1 1 0 0 0 1 1 |
| 15 | 0 0 0 0 0 1 0 1 0 0 1 |
| 16 | 0 0 1 0 0 1 0 0 0 0 1 |
| 17 | 0 0 0 0 0 1 1 0 1 1 1 0 |
| 18 | 0 0 0 1 1 1 1 0 0 0 1 |
| 19 | 1 0 0 0 1 0 0 0 0 1 1 |
| 20 | 0 1 1 1 1 0 1 0 1 1 1 1 |
| 21 | 0 1 1 1 0 1 0 0 1 1 0 1 |
| 22 | 0 1 1 1 1 0 1 0 1 0 0 0 |
| 23 | 0 1 1 0 0 0 0 0 1 0 0 |
| 24 | 0 1 1 1 1 1 1 1 1 0 0 |
| 25 | 0 1 1 1 0 0 1 1 1 0 0 |
| 26 | 0 1 1 1 0 1 1 1 0 1 1 1 |
| 27 | 0 1 1 1 1 1 0 0 0 1 1 |
| 28 | 0 1 1 1 1 0 0 0 0 0 1 1 |
| 29 | 0 1 1 1 0 1 1 1 1 0 1 1 |

Table 5.5 shows set of length 18 BPSK sequences for π/2 BPSK DMRS:

TABLE 5.5

| Index | b(0), ..., b(17) |
|---|---|
| 0 | 0 0 0 0 0 0 1 0 0 1 1 1 1 1 0 0 0 1 |
| 1 | 0 0 0 0 0 0 0 1 1 1 1 1 0 0 1 0 0 1 |
| 2 | 0 0 0 0 0 1 1 1 0 1 1 0 1 1 1 1 |
| 3 | 0 1 0 1 1 0 1 1 0 0 1 1 0 1 0 1 1 |
| 4 | 1 1 0 1 0 1 0 1 0 1 0 0 1 1 1 1 0 |
| 5 | 0 1 0 1 0 1 1 0 0 1 0 1 1 0 1 1 0 |
| 6 | 0 0 0 1 1 1 0 0 1 0 0 0 1 1 1 1 |
| 7 | 0 1 0 1 0 0 0 1 1 0 1 0 0 0 0 1 1 |
| 8 | 0 0 1 0 1 0 0 0 1 0 1 0 0 1 0 0 0 1 |
| 9 | 1 0 1 1 0 0 0 1 0 1 0 1 0 0 0 0 1 |
| 10 | 1 0 1 1 0 0 1 1 1 1 0 0 0 0 0 0 1 |
| 11 | 1 1 0 1 0 1 1 0 1 0 1 1 1 1 0 0 0 |
| 12 | 1 0 0 0 1 0 1 0 1 0 0 0 1 1 0 1 0 1 |
| 13 | 1 0 1 1 0 1 0 1 1 1 0 0 0 0 0 1 1 0 |
| 14 | 0 0 0 0 0 1 1 1 0 1 1 0 1 0 1 1 0 0 |
| 15 | 0 0 1 1 1 0 1 1 0 1 0 0 0 1 1 0 1 0 |

TABLE 5.5-continued

| Index | b(0), ..., b(17) | | | | | | | | | | | | | | | | | |
|---|---|---|---|---|---|---|---|---|---|---|---|---|---|---|---|---|---|---|
| 16 | 0 | 1 | 0 | 0 | 1 | 0 | 0 | 0 | 1 | 1 | 1 | 0 | 1 | 0 | 0 | 1 | 1 | 1 |
| 17 | 0 | 1 | 0 | 0 | 1 | 1 | 0 | 1 | 1 | 0 | 0 | 0 | 0 | 0 | 0 | 0 | 1 | 0 |
| 18 | 0 | 0 | 1 | 0 | 0 | 1 | 1 | 1 | 1 | 0 | 0 | 0 | 0 | 0 | 1 | 1 | 0 | 0 |
| 19 | 0 | 0 | 0 | 0 | 0 | 0 | 1 | 0 | 0 | 1 | 0 | 0 | 1 | 1 | 0 | 1 | 1 | 1 |
| 20 | 0 | 0 | 0 | 0 | 0 | 1 | 1 | 0 | 0 | 0 | 0 | 1 | 0 | 0 | 1 | 1 | 1 | 1 |
| 21 | 1 | 1 | 1 | 1 | 0 | 1 | 0 | 1 | 1 | 1 | 1 | 0 | 0 | 1 | 0 | 0 | 0 | 1 |
| 22 | 1 | 0 | 0 | 1 | 0 | 0 | 0 | 1 | 0 | 0 | 1 | 1 | 1 | 1 | 0 | 1 | 1 | 1 |
| 23 | 0 | 0 | 1 | 0 | 0 | 0 | 1 | 1 | 1 | 0 | 0 | 0 | 1 | 0 | 0 | 1 | 0 | 1 |
| 24 | 1 | 1 | 0 | 1 | 1 | 0 | 0 | 0 | 0 | 0 | 0 | 1 | 1 | 0 | 1 | 1 | 1 | 0 |
| 25 | 1 | 1 | 0 | 1 | 0 | 1 | 0 | 1 | 1 | 0 | 0 | 0 | 1 | 0 | 0 | 1 | 1 | 0 |
| 26 | 0 | 1 | 1 | 1 | 1 | 1 | 1 | 0 | 0 | 1 | 0 | 1 | 0 | 0 | 1 | 0 | 0 | 0 |
| 27 | 0 | 1 | 1 | 0 | 1 | 1 | 1 | 0 | 0 | 0 | 1 | 0 | 0 | 0 | 1 | 1 | 0 | 0 |
| 28 | 0 | 0 | 0 | 1 | 1 | 0 | 0 | 0 | 0 | 0 | 0 | 0 | 0 | 1 | 1 | 0 | 0 | 0 |
| 29 | 0 | 1 | 1 | 1 | 0 | 1 | 1 | 0 | 1 | 0 | 1 | 1 | 1 | 0 | 1 | 1 | 0 | 0 |

Table 5.6 shows set of length 24 BPSK sequences for π/2 BPSK DMRS:

TABLE 5.6

| Index | b(0), ..., b(23) | | | | | | | | | | | | | | | | | | | | | | | |
|---|---|---|---|---|---|---|---|---|---|---|---|---|---|---|---|---|---|---|---|---|---|---|---|---|
| 0 | 0 | 0 | 0 | 0 | 0 | 0 | 0 | 1 | 0 | 0 | 1 | 1 | 1 | 1 | 1 | 0 | 0 | 1 | 0 | 0 | 1 | 0 | 0 | 1 |
| 1 | 0 | 0 | 0 | 0 | 0 | 0 | 0 | 1 | 0 | 0 | 1 | 0 | 1 | 1 | 0 | 1 | 1 | 1 | 0 | 0 | 0 | 1 | 1 | 0 |
| 2 | 0 | 0 | 0 | 0 | 0 | 0 | 0 | 0 | 1 | 0 | 0 | 1 | 0 | 0 | 1 | 0 | 0 | 1 | 1 | 1 | 1 | 0 | 1 | 1 |
| 3 | 0 | 0 | 0 | 0 | 0 | 0 | 0 | 1 | 1 | 0 | 1 | 1 | 0 | 1 | 0 | 1 | 0 | 1 | 1 | 0 | 1 | 0 | 1 | 1 |
| 4 | 1 | 0 | 0 | 1 | 1 | 1 | 1 | 0 | 1 | 1 | 0 | 1 | 1 | 0 | 1 | 0 | 1 | 0 | 0 | 0 | 1 | 1 | 1 | 1 |
| 5 | 1 | 0 | 1 | 0 | 1 | 1 | 0 | 1 | 1 | 0 | 0 | 1 | 1 | 1 | 1 | 1 | 0 | 0 | 1 | 1 | 0 | 1 | 1 | 1 |
| 6 | 0 | 1 | 1 | 0 | 0 | 1 | 0 | 0 | 1 | 1 | 1 | 1 | 1 | 1 | 0 | 1 | 1 | 1 | 1 | 0 | 1 | 1 | 0 | 1 |
| 7 | 1 | 0 | 1 | 1 | 1 | 1 | 1 | 1 | 1 | 1 | 1 | 0 | 1 | 0 | 0 | 1 | 1 | 1 | 0 | 0 | 1 | 1 | 0 | 1 |
| 8 | 0 | 0 | 1 | 0 | 0 | 1 | 0 | 1 | 0 | 0 | 0 | 1 | 0 | 0 | 1 | 0 | 0 | 0 | 0 | 0 | 1 | 1 | 1 | 0 |
| 9 | 0 | 0 | 0 | 0 | 1 | 0 | 0 | 1 | 1 | 0 | 0 | 1 | 0 | 0 | 0 | 0 | 1 | 1 | 0 | 0 | 0 | 1 | 0 | 1 |
| 10 | 1 | 0 | 1 | 0 | 0 | 0 | 1 | 1 | 1 | 0 | 0 | 1 | 1 | 1 | 1 | 0 | 1 | 1 | 1 | 1 | 0 | 0 | 1 | 0 |
| 11 | 0 | 0 | 1 | 0 | 0 | 1 | 0 | 0 | 0 | 0 | 1 | 1 | 1 | 0 | 0 | 1 | 0 | 0 | 1 | 0 | 1 | 0 | 1 | 0 |
| 12 | 1 | 0 | 1 | 0 | 0 | 1 | 1 | 1 | 0 | 1 | 0 | 0 | 0 | 1 | 0 | 1 | 1 | 1 | 0 | 0 | 1 | 0 | 1 | 1 |
| 13 | 1 | 0 | 1 | 0 | 0 | 1 | 1 | 0 | 1 | 0 | 1 | 1 | 0 | 1 | 1 | 1 | 0 | 1 | 1 | 0 | 0 | 1 | 1 | 0 |
| 14 | 1 | 0 | 1 | 0 | 0 | 0 | 1 | 0 | 0 | 1 | 1 | 1 | 0 | 0 | 0 | 0 | 1 | 0 | 0 | 1 | 0 | 1 | 1 | 1 |
| 15 | 1 | 0 | 0 | 1 | 0 | 1 | 0 | 0 | 1 | 1 | 0 | 0 | 0 | 1 | 1 | 1 | 1 | 1 | 1 | 1 | 0 | 0 | 0 | 1 |
| 16 | 0 | 0 | 0 | 1 | 1 | 0 | 1 | 0 | 0 | 1 | 0 | 0 | 1 | 1 | 1 | 0 | 1 | 1 | 1 | 1 | 0 | 0 | 0 | 1 |
| 17 | 1 | 1 | 0 | 1 | 0 | 1 | 1 | 1 | 0 | 0 | 1 | 1 | 1 | 0 | 0 | 0 | 0 | 0 | 0 | 1 | 1 | 0 | 1 | 0 |
| 18 | 0 | 0 | 0 | 0 | 0 | 0 | 0 | 0 | 1 | 1 | 1 | 1 | 0 | 0 | 0 | 0 | 1 | 0 | 1 | 1 | 0 | 0 | 0 | 1 |
| 19 | 1 | 0 | 0 | 0 | 1 | 0 | 1 | 1 | 0 | 0 | 0 | 1 | 0 | 0 | 0 | 0 | 0 | 0 | 0 | 0 | 0 | 1 | 1 | 1 |
| 20 | 0 | 0 | 0 | 0 | 0 | 0 | 1 | 1 | 0 | 1 | 1 | 0 | 0 | 0 | 0 | 1 | 1 | 0 | 0 | 0 | 1 | 0 | 1 | 0 |
| 21 | 0 | 1 | 1 | 0 | 1 | 0 | 1 | 1 | 1 | 0 | 0 | 0 | 0 | 1 | 0 | 0 | 0 | 1 | 0 | 0 | 0 | 1 | 1 | 1 |
| 22 | 1 | 0 | 1 | 0 | 0 | 1 | 0 | 0 | 0 | 0 | 0 | 1 | 1 | 1 | 0 | 0 | 1 | 0 | 0 | 0 | 1 | 0 | 1 | 1 |
| 23 | 1 | 0 | 0 | 1 | 1 | 0 | 1 | 0 | 0 | 0 | 0 | 0 | 1 | 1 | 1 | 1 | 1 | 1 | 1 | 1 | 0 | 0 | 1 | 1 |
| 24 | 1 | 0 | 0 | 0 | 1 | 0 | 0 | 1 | 0 | 1 | 0 | 0 | 0 | 0 | 1 | 1 | 1 | 1 | 1 | 1 | 0 | 0 | 0 | 0 |
| 25 | 1 | 0 | 1 | 0 | 1 | 1 | 0 | 0 | 1 | 0 | 0 | 0 | 0 | 1 | 1 | 1 | 1 | 1 | 1 | 0 | 0 | 1 | 0 | 0 |
| 26 | 0 | 1 | 0 | 0 | 1 | 0 | 1 | 0 | 1 | 1 | 0 | 0 | 0 | 1 | 1 | 1 | 1 | 1 | 0 | 0 | 1 | 0 | 0 | 0 |
| 27 | 0 | 1 | 0 | 1 | 1 | 0 | 1 | 0 | 1 | 0 | 1 | 0 | 1 | 1 | 0 | 0 | 1 | 0 | 0 | 1 | 0 | 1 | 1 | 1 |
| 28 | 0 | 1 | 0 | 0 | 0 | 1 | 1 | 0 | 1 | 0 | 1 | 0 | 1 | 1 | 0 | 1 | 0 | 0 | 1 | 0 | 0 | 0 | 1 | 1 |
| 29 | 0 | 1 | 0 | 0 | 1 | 0 | 0 | 1 | 1 | 1 | 1 | 1 | 1 | 1 | 0 | 1 | 0 | 0 | 1 | 1 | 0 | 0 | 0 | 0 |

Table 6.1 shows a set of length-12 CGS BPSK Sequences for π/2 BPSK DMRS:

TABLE 6.1

| Index | length-12 CGS BPSK Sequences for π/2 BPSK DMRS | | | | | | | | | | | |
|---|---|---|---|---|---|---|---|---|---|---|---|---|
| 1 | 0 | 0 | 0 | 0 | 1 | 0 | 0 | 1 | 0 | 0 | 0 | 1 |
| 2 | 0 | 0 | 1 | 0 | 0 | 1 | 0 | 0 | 0 | 0 | 0 | 1 |
| 3 | 0 | 0 | 0 | 0 | 0 | 0 | 1 | 1 | 1 | 1 | 1 | 1 |
| 4 | 0 | 1 | 1 | 1 | 1 | 1 | 0 | 0 | 0 | 0 | 0 | 0 |
| 5 | 0 | 0 | 0 | 0 | 0 | 1 | 1 | 0 | 1 | 1 | 1 | 1 |
| 6 | 1 | 1 | 0 | 1 | 1 | 1 | 0 | 0 | 0 | 0 | 0 | 0 |
| 7 | 0 | 0 | 0 | 0 | 0 | 0 | 1 | 1 | 1 | 0 | 1 | 0 |
| 8 | 1 | 1 | 0 | 1 | 1 | 0 | 0 | 0 | 0 | 0 | 0 | 1 |
| 9 | 0 | 0 | 0 | 0 | 0 | 0 | 1 | 1 | 1 | 0 | 1 | 1 |
| 10 | 1 | 1 | 0 | 1 | 1 | 0 | 0 | 0 | 0 | 0 | 0 | 0 |
| 11 | 0 | 0 | 0 | 0 | 0 | 1 | 1 | 0 | 1 | 1 | 1 | 0 |
| 12 | 1 | 0 | 1 | 1 | 1 | 0 | 0 | 0 | 0 | 0 | 0 | 1 |

TABLE 6.1-continued

| Index | length-12 CGS BPSK Sequences for π/2 BPSK DMRS | | | | | | | | | | | |
|---|---|---|---|---|---|---|---|---|---|---|---|---|
| 13 | 0 | 0 | 0 | 0 | 0 | 1 | 0 | 0 | 0 | 1 | 0 | 0 |
| 14 | 1 | 0 | 0 | 0 | 1 | 0 | 0 | 0 | 0 | 0 | 0 | 0 |
| 15 | 0 | 0 | 0 | 0 | 1 | 0 | 0 | 1 | 1 | 0 | 1 | 0 |
| 16 | 0 | 1 | 1 | 0 | 1 | 0 | 0 | 0 | 0 | 0 | 1 | 0 |
| 17 | 0 | 0 | 0 | 0 | 1 | 0 | 1 | 1 | 0 | 0 | 1 | 0 |
| 18 | 1 | 1 | 0 | 0 | 1 | 0 | 1 | 1 | 0 | 0 | 1 | 0 |
| 19 | 0 | 0 | 0 | 0 | 0 | 0 | 1 | 0 | 0 | 0 | 0 | 1 |
| 20 | 1 | 0 | 0 | 0 | 0 | 1 | 0 | 0 | 0 | 0 | 0 | 0 |
| 21 | 0 | 0 | 0 | 0 | 0 | 1 | 0 | 0 | 1 | 1 | 0 | 1 |
| 22 | 0 | 0 | 1 | 1 | 0 | 1 | 0 | 0 | 0 | 0 | 0 | 1 |
| 23 | 0 | 0 | 0 | 0 | 0 | 1 | 0 | 1 | 1 | 0 | 0 | 1 |
| 24 | 0 | 1 | 1 | 0 | 0 | 1 | 0 | 0 | 0 | 0 | 0 | 1 |
| 25 | 0 | 0 | 0 | 0 | 0 | 1 | 1 | 0 | 0 | 1 | 0 | 1 |
| 26 | 1 | 0 | 0 | 1 | 0 | 1 | 0 | 0 | 0 | 0 | 0 | 1 |

TABLE 6.1-continued

| Index | length-12 CGS BPSK Sequences for π/2 BPSK DMRS | | | | | | | | | | | |
|---|---|---|---|---|---|---|---|---|---|---|---|---|
| 27 | 0 | 0 | 0 | 0 | 0 | 0 | 0 | 0 | 1 | 0 | 0 | 1 |
| 28 | 0 | 0 | 1 | 0 | 0 | 1 | 0 | 0 | 0 | 0 | 0 | 0 |
| 29 | 0 | 0 | 0 | 0 | 0 | 0 | 0 | 1 | 0 | 0 | 1 | 0 |
| 30 | 0 | 1 | 0 | 0 | 1 | 0 | 0 | 0 | 0 | 0 | 0 | 0 |

Table 6.2 shows a set of length-18 CGS BPSK Sequences for π/2 BPSK DMRS:

TABLE 6.2

| Index | Length-18 CGS BPSK Sequences for π/2 BPSK DMRS | | | | | | | | | | | | | | | | | |
|---|---|---|---|---|---|---|---|---|---|---|---|---|---|---|---|---|---|---|
| 1 | 0 | 0 | 0 | 0 | 0 | 0 | 0 | 1 | 0 | 0 | 1 | 0 | 0 | 1 | 1 | 0 | 1 | 1 |
| 2 | 0 | 1 | 0 | 0 | 1 | 1 | 0 | 1 | 1 | 0 | 0 | 0 | 0 | 0 | 0 | 0 | 1 | 0 |
| 3 | 0 | 0 | 0 | 0 | 0 | 1 | 1 | 0 | 0 | 0 | 0 | 1 | 0 | 0 | 1 | 1 | 1 | 1 |
| 4 | 0 | 0 | 1 | 0 | 0 | 1 | 1 | 1 | 1 | 0 | 0 | 0 | 0 | 0 | 1 | 1 | 0 | 0 |
| 5 | 0 | 0 | 0 | 0 | 0 | 0 | 1 | 1 | 1 | 0 | 0 | 0 | 1 | 1 | 1 | 1 | 1 | 0 |
| 6 | 0 | 0 | 0 | 1 | 1 | 1 | 1 | 1 | 0 | 0 | 0 | 0 | 0 | 0 | 0 | 1 | 1 | 1 |
| 7 | 0 | 0 | 0 | 0 | 0 | 0 | 0 | 1 | 1 | 1 | 0 | 0 | 0 | 1 | 1 | 1 | 1 | 1 |
| 8 | 1 | 0 | 0 | 0 | 1 | 1 | 1 | 1 | 1 | 0 | 0 | 0 | 0 | 0 | 0 | 0 | 1 | 1 |
| 9 | 0 | 0 | 0 | 0 | 0 | 0 | 1 | 1 | 0 | 1 | 0 | 1 | 1 | 1 | 0 | 1 | 1 | 0 |
| 10 | 1 | 0 | 1 | 1 | 1 | 0 | 1 | 1 | 0 | 0 | 0 | 0 | 0 | 0 | 0 | 1 | 1 | 0 |
| 11 | 0 | 0 | 0 | 0 | 0 | 0 | 1 | 1 | 1 | 0 | 0 | 0 | 1 | 1 | 1 | 1 | 1 | 0 |
| 12 | 0 | 0 | 0 | 1 | 1 | 1 | 1 | 1 | 0 | 0 | 0 | 0 | 0 | 0 | 0 | 1 | 1 | 1 |
| 13 | 0 | 0 | 0 | 0 | 0 | 0 | 0 | 0 | 0 | 1 | 1 | 0 | 0 | 0 | 1 | 1 | 1 | 0 |
| 14 | 0 | 1 | 1 | 0 | 0 | 0 | 1 | 1 | 0 | 0 | 0 | 0 | 0 | 0 | 0 | 0 | 0 | 0 |
| 15 | 0 | 0 | 0 | 0 | 0 | 0 | 0 | 1 | 1 | 0 | 0 | 0 | 0 | 0 | 1 | 1 | 1 | 0 |
| 16 | 1 | 0 | 0 | 0 | 0 | 0 | 1 | 1 | 0 | 0 | 0 | 0 | 0 | 0 | 0 | 0 | 0 | 1 |
| 17 | 0 | 0 | 0 | 0 | 0 | 0 | 0 | 0 | 1 | 0 | 0 | 1 | 0 | 0 | 1 | 1 | 1 | 1 |
| 18 | 1 | 0 | 0 | 1 | 0 | 0 | 1 | 1 | 1 | 0 | 0 | 0 | 0 | 0 | 0 | 0 | 0 | 0 |
| 19 | 0 | 0 | 0 | 0 | 0 | 0 | 0 | 0 | 0 | 1 | 1 | 1 | 0 | 0 | 1 | 0 | 0 | 1 |
| 20 | 1 | 1 | 1 | 0 | 0 | 1 | 0 | 0 | 1 | 0 | 0 | 0 | 0 | 0 | 0 | 0 | 0 | 0 |
| 21 | 0 | 0 | 0 | 0 | 0 | 0 | 0 | 1 | 0 | 0 | 1 | 0 | 0 | 1 | 1 | 1 | 1 | 0 |
| 22 | 0 | 0 | 1 | 0 | 0 | 1 | 1 | 1 | 0 | 0 | 0 | 0 | 0 | 0 | 0 | 0 | 0 | 1 |
| 23 | 0 | 0 | 0 | 0 | 0 | 0 | 0 | 1 | 1 | 1 | 0 | 0 | 1 | 0 | 0 | 1 | 1 | 0 |
| 24 | 1 | 1 | 0 | 0 | 1 | 0 | 0 | 1 | 0 | 0 | 0 | 0 | 0 | 0 | 0 | 0 | 0 | 1 |
| 25 | 0 | 0 | 0 | 0 | 1 | 0 | 1 | 1 | 0 | 1 | 1 | 0 | 1 | 0 | 0 | 0 | 0 | 1 |
| 26 | 0 | 1 | 1 | 0 | 1 | 0 | 0 | 1 | 0 | 0 | 0 | 0 | 1 | 0 | 1 | 1 | 1 | 1 |
| 27 | 0 | 0 | 0 | 0 | 0 | 1 | 0 | 0 | 1 | 0 | 1 | 1 | 0 | 1 | 0 | 1 | 1 | 0 |
| 28 | 0 | 1 | 1 | 0 | 1 | 0 | 1 | 1 | 0 | 0 | 0 | 0 | 0 | 1 | 0 | 0 | 0 | 1 |
| 29 | 0 | 0 | 0 | 0 | 0 | 0 | 1 | 1 | 0 | 1 | 1 | 0 | 0 | 1 | 0 | 0 | 1 | 0 |
| 30 | 1 | 1 | 0 | 0 | 1 | 0 | 0 | 1 | 0 | 0 | 0 | 0 | 0 | 0 | 0 | 1 | 1 | 0 |

Table 6.3 shows a set of length-24 CGS BPSK Sequences for π/2 BPSK DMRS:

TABLE 6.3

| Index | Length-24 CGS BPSK Sequences for π/2 BPSK DMRS | | | | | | | | | | | | | | | | | | | | | | | |
|---|---|---|---|---|---|---|---|---|---|---|---|---|---|---|---|---|---|---|---|---|---|---|---|---|
| 1 | 0 | 0 | 0 | 0 | 0 | 0 | 0 | 0 | 0 | 1 | 1 | 1 | 1 | 0 | 0 | 0 | 1 | 0 | 1 | 1 | 0 | 0 | 0 | 1 |
| 2 | 1 | 0 | 0 | 0 | 1 | 0 | 1 | 1 | 0 | 0 | 0 | 1 | 1 | 0 | 0 | 0 | 0 | 0 | 0 | 0 | 0 | 1 | 1 | 1 |
| 3 | 0 | 0 | 0 | 0 | 0 | 1 | 1 | 1 | 0 | 1 | 1 | 0 | 0 | 0 | 1 | 1 | 0 | 0 | 1 | 0 | 1 | 0 | 1 | 0 |
| 4 | 0 | 0 | 0 | 1 | 1 | 0 | 0 | 0 | 1 | 0 | 1 | 0 | 0 | 0 | 0 | 0 | 0 | 1 | 1 | 1 | 0 | 1 | 1 | 1 |
| 5 | 0 | 0 | 0 | 0 | 0 | 0 | 1 | 0 | 0 | 1 | 1 | 1 | 0 | 0 | 0 | 0 | 0 | 0 | 0 | 0 | 0 | 1 | 1 | 1 |
| 6 | 1 | 1 | 1 | 0 | 0 | 0 | 0 | 0 | 0 | 1 | 0 | 1 | 0 | 0 | 0 | 0 | 0 | 1 | 0 | 0 | 1 | 1 | 1 | 0 |
| 7 | 0 | 0 | 0 | 0 | 0 | 0 | 0 | 1 | 0 | 0 | 1 | 0 | 1 | 1 | 1 | 0 | 1 | 0 | 1 | 0 | 0 | 0 | 0 | 1 |
| 8 | 0 | 1 | 1 | 1 | 0 | 0 | 1 | 0 | 1 | 0 | 0 | 1 | 0 | 0 | 0 | 0 | 0 | 0 | 0 | 1 | 0 | 0 | 0 | 1 |
| 9 | 0 | 0 | 0 | 0 | 0 | 0 | 0 | 1 | 1 | 0 | 1 | 1 | 1 | 0 | 0 | 0 | 0 | 0 | 1 | 1 | 0 | 0 | 0 | 1 |
| 10 | 1 | 0 | 0 | 0 | 0 | 0 | 1 | 1 | 0 | 0 | 0 | 1 | 0 | 0 | 0 | 0 | 0 | 1 | 1 | 1 | 0 | 1 | 1 | 1 |
| 11 | 0 | 0 | 0 | 0 | 0 | 0 | 0 | 0 | 0 | 0 | 1 | 1 | 0 | 1 | 1 | 0 | 0 | 0 | 1 | 1 | 1 | 1 | 1 | 1 |
| 12 | 1 | 0 | 1 | 1 | 0 | 0 | 0 | 1 | 1 | 0 | 1 | 1 | 0 | 0 | 0 | 0 | 0 | 0 | 0 | 0 | 0 | 0 | 0 | 1 |
| 13 | 0 | 0 | 0 | 0 | 0 | 1 | 1 | 1 | 0 | 0 | 1 | 1 | 0 | 1 | 1 | 0 | 0 | 0 | 0 | 0 | 1 | 0 | 1 | 0 |
| 14 | 0 | 1 | 1 | 0 | 0 | 0 | 0 | 0 | 0 | 1 | 0 | 0 | 0 | 0 | 0 | 0 | 1 | 1 | 1 | 0 | 0 | 0 | 1 | 1 |
| 15 | 0 | 0 | 0 | 0 | 0 | 0 | 0 | 0 | 1 | 1 | 0 | 1 | 0 | 0 | 1 | 1 | 0 | 0 | 1 | 0 | 1 | 1 | 1 | 1 |
| 16 | 1 | 0 | 0 | 1 | 1 | 1 | 0 | 0 | 1 | 0 | 1 | 1 | 0 | 0 | 0 | 0 | 0 | 0 | 0 | 0 | 0 | 1 | 1 | 0 |
| 17 | 0 | 0 | 0 | 0 | 1 | 0 | 0 | 1 | 1 | 1 | 1 | 0 | 0 | 1 | 0 | 0 | 0 | 0 | 1 | 0 | 1 | 0 | 1 | 0 |
| 18 | 0 | 0 | 1 | 0 | 0 | 0 | 0 | 1 | 0 | 1 | 0 | 0 | 0 | 0 | 0 | 1 | 0 | 0 | 1 | 1 | 1 | 1 | 1 | 1 |
| 19 | 0 | 0 | 0 | 0 | 0 | 1 | 1 | 0 | 0 | 1 | 0 | 0 | 1 | 1 | 0 | 0 | 1 | 0 | 1 | 1 | 1 | 1 | 1 | 0 |
| 20 | 1 | 1 | 0 | 0 | 1 | 0 | 1 | 1 | 1 | 1 | 0 | 0 | 0 | 0 | 0 | 0 | 1 | 0 | 1 | 0 | 0 | 1 | 0 | 0 |
| 21 | 0 | 0 | 0 | 0 | 0 | 1 | 1 | 0 | 1 | 1 | 0 | 1 | 1 | 1 | 0 | 0 | 0 | 0 | 1 | 0 | 0 | 0 | 1 | 0 |
| 22 | 1 | 1 | 1 | 1 | 0 | 0 | 0 | 1 | 0 | 1 | 0 | 0 | 0 | 0 | 0 | 0 | 1 | 1 | 1 | 0 | 1 | 1 | 1 | 0 |
| 23 | 0 | 0 | 0 | 0 | 0 | 0 | 0 | 1 | 0 | 0 | 1 | 1 | 1 | 1 | 0 | 0 | 0 | 0 | 1 | 1 | 0 | 0 | 0 | 1 |
| 24 | 1 | 1 | 1 | 0 | 0 | 0 | 0 | 1 | 0 | 0 | 1 | 0 | 0 | 0 | 0 | 0 | 0 | 0 | 1 | 0 | 0 | 1 | 1 | 1 |
| 25 | 0 | 0 | 0 | 0 | 1 | 0 | 0 | 0 | 1 | 0 | 0 | 0 | 0 | 0 | 1 | 0 | 0 | 1 | 1 | 1 | 1 | 0 | 1 | 1 |

TABLE 6.3-continued

| Index | Length-24 CGS BPSK Sequences for π/2 BPSK DMRS | | | | | | | | | | | | | | | | | | | | | | | |
|---|---|---|---|---|---|---|---|---|---|---|---|---|---|---|---|---|---|---|---|---|---|---|---|---|
| 26 | 0 | 0 | 1 | 0 | 0 | 1 | 1 | 1 | 1 | 0 | 1 | 1 | 0 | 0 | 0 | 0 | 1 | 0 | 0 | 0 | 1 | 0 | 0 | 0 |
| 27 | 0 | 0 | 0 | 0 | 0 | 0 | 1 | 0 | 1 | 1 | 0 | 1 | 1 | 1 | 1 | 1 | 0 | 0 | 1 | 0 | 0 | 1 | 1 | 1 |
| 28 | 1 | 1 | 1 | 1 | 1 | 0 | 0 | 1 | 0 | 0 | 1 | 1 | 0 | 0 | 0 | 0 | 0 | 0 | 0 | 1 | 0 | 1 | 1 | 0 |
| 29 | 0 | 0 | 0 | 0 | 0 | 1 | 0 | 1 | 0 | 0 | 1 | 1 | 1 | 0 | 1 | 1 | 1 | 1 | 0 | 0 | 0 | 1 | 1 | 0 |
| 30 | 1 | 0 | 1 | 1 | 1 | 1 | 0 | 0 | 0 | 1 | 1 | 0 | 0 | 0 | 0 | 0 | 0 | 1 | 0 | 1 | 0 | 0 | 1 | 1 |

FIGS. 11 to 14 show the CDF of the PAPR of the proposed sequences in comparison with the existing NR sequences and the sequences for length 6, 12, 24 and 18 respectively, in accordance with an embodiment of the present disclosure. As shown in the FIGS. 11 to 14, the generated sequences using FIG. 10, have at least 1-2 dB gain in terms of PAPR performance over the existing NR sequences. Due to the PAPR gap between the DMRS and the PUSCH, cell edge users will have to reduce the transmit power of PUxCH, where x is used to indicated PUCCH for control channel and PUSCH for shared channel, to account for the peak PA power limit, which may result in a cell coverage loss. Hence, it is proposed to use the proposed sequences to avoid such asymmetries.

While the PAPR performance of our sequences is close to that of the sequences in [2], it is shown that the sequences perform significantly better in terms of the correlation performance across the sequences.

Figure 11:
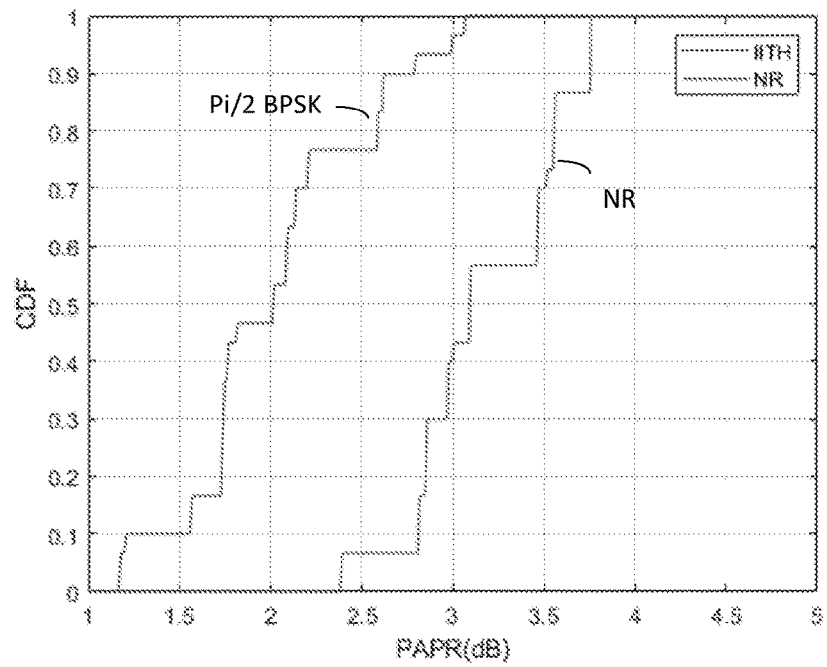
FIGS. 11-14 show the CDF of the PAPR of the proposed sequences in comparison with the existing NR sequences and the sequences for length 6, 12, 24 and 18 respectively, in accordance with an embodiment of the present disclosure.
Figure 12:
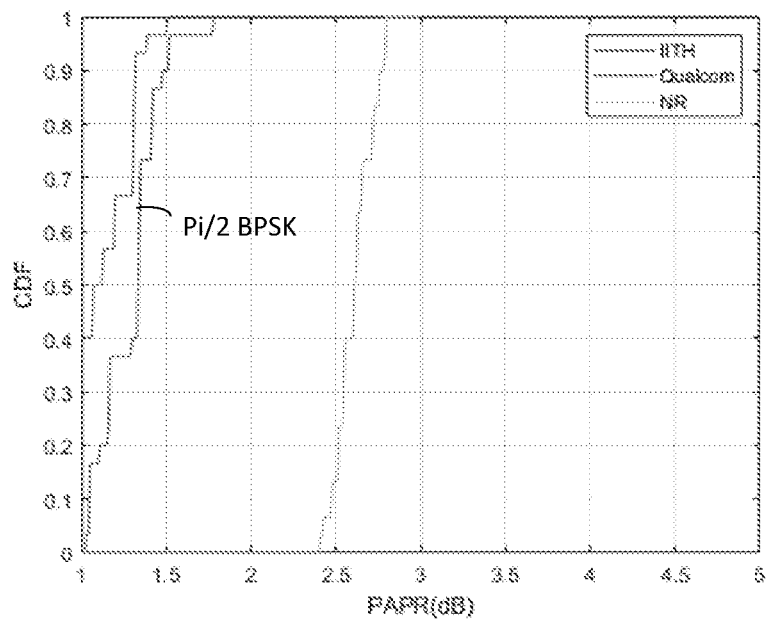

FIG. 11 shows a plot illustrating CDF of the PAPR of the length-6 proposed sequences and the NR CGS sequences. FIG. 12 shows a plot illustrating CDF of the PAPR of the length-12 proposed sequences and the NR CGS sequences.

Figure 13:
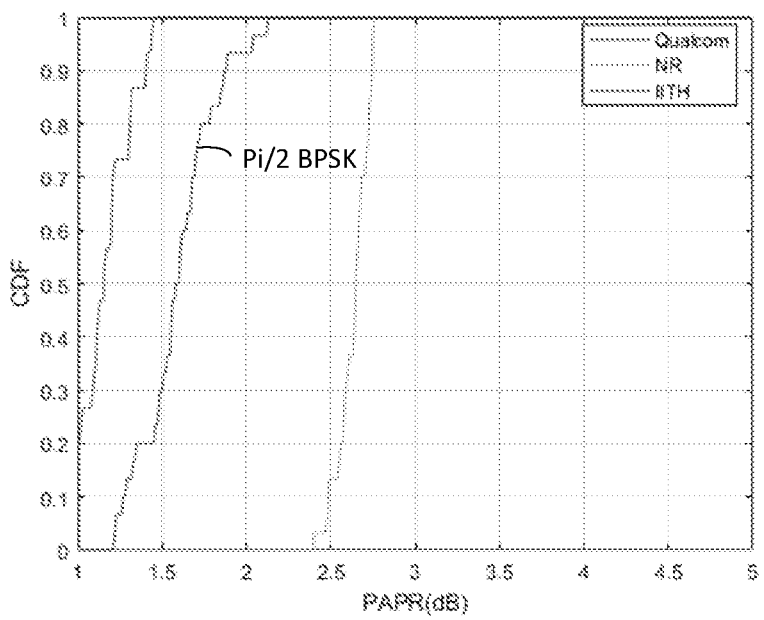

FIG. 13 shows a plot illustrating CDF of the PAPR of the length-24 proposed sequences and the NR CGS sequences.

Figure 14:
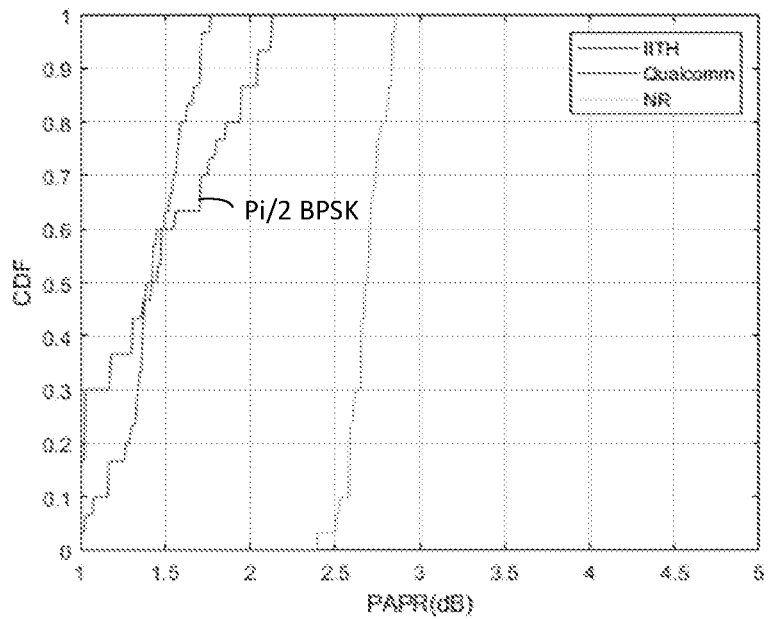

FIG. 14 shows a plot illustrating CDF of the PAPR of the length-18 proposed sequences and the NR CGS sequences.

As shown in the FIGS. 11 to 14 it may be observed that the pi/2-BPSK based CGS sequences have a total power gain of 2 dB compared to the existing NR Rel-15 DMRS sequences.

One embodiment of the present disclosure is Cross correlation performance. FIGS. 15 to 18 show the comparison of cross correlation performance of the proposed sequences across all the 30 base sequences with that of 30 QPSK based sequences and the sequences. As can be seen from the figure, the QPSK based sequences are relatively highly correlated compared to that of the propose sequences. High correlation across the base sequences might result to inter cell/sector interference, especially for cell edge UEs. Furthermore, having orthogonal sequences helps in multiple user multiplexing within the same cell.

Figure 15:
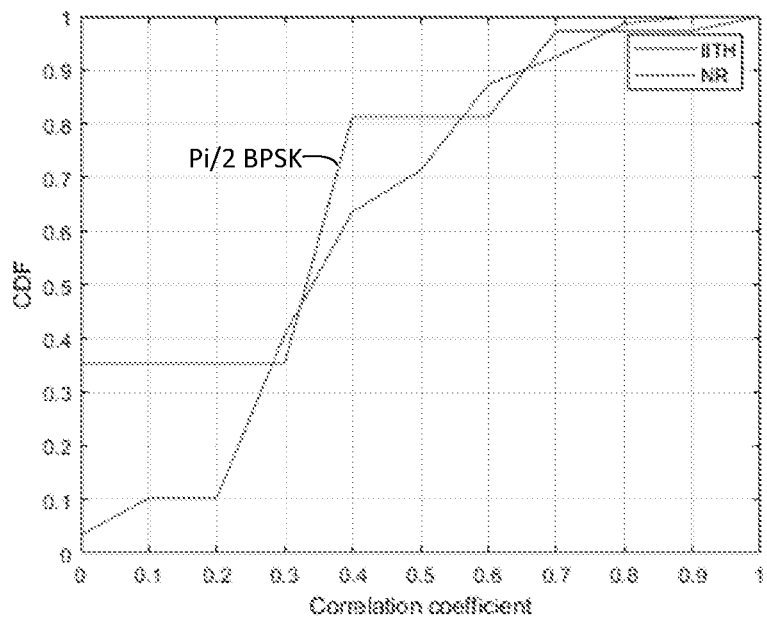
Figure 16:
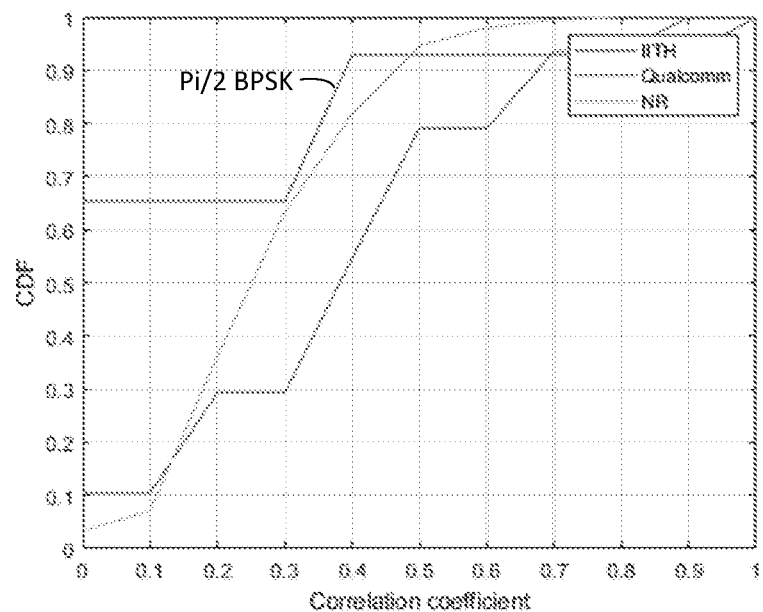

FIG. 15 show a plot illustrating CDF of the correlation performance of the length-6 proposed sequences and the NR CGS sequences. FIG. 16 show a plot illustrating CDF of the correlation performance of the length-12 proposed sequences and the NR CGS sequences. FIG. 17 show a plot illustrating CDF of the correlation performance of the length-18 proposed sequences and the NR CGS sequences. FIG. 18 show a plot illustrating CDF of the correlation performance of the length-24 proposed sequences and the NR CGS sequences.

As shown in the FIGS. 15 to 18 it may be observed that the proposed pi/2-BPSK based CGS sequences may provide orthogonal sequences which can be used for multiple UE multiplexing.

One embodiment of the present disclosure is Link level performance FIG. 19 shows a plot illustrating BER performance for PUCCH format-4 with pi/2 BPSK modulation. As shown in FIG. 20, the BER performance for PUCCH format 4 with pi/2 BPSK modulation is shown when the DMRS sequences are chosen from the proposed set and when the NR sequences are used from TR 38.211 Clause 5.2.2. The simulation assumptions are shown below Table 7:

TABLE 7

| Simulation Assumption | Value |
|---|---|
| Allocation Size | 1 PRB |
| Sub carrier spacing | 30 Khz |
| Channel Model | TDLC |
| Channel Coding | Reed Muller |

As shown in the Table 7, it is clearly seen that the proposed sequences do not affect the performance of the PUCCH channel. The link level performance of the proposed pi/2-BPSK sequences for DMRS is similar to the performance provided by the existing NR sequences.

It is clearly shown that the new CGS-based DMRS sequences for pi/2-BPSK modulation have significantly better performance in terms of PAPR and also correlation properties compared to the existing NR sequences and the sequences shown in the tables 1 to 6.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method for generating a waveform in a communication network, the method comprising:
   selecting, by a user equipment (UE) transmitter, at least one sequence from a plurality of sequences based on an indication by a base station (BS) to a user equipment (UE), wherein:
      said plurality of sequences comprises a plurality of sub-sets of sequences such that a sequence in a sub-set of sequences is a cyclic shifted version of another sequence in the said sub-set of sequences, and
      each of the plurality of sequences is a Binary Phase Shift Keying (BPSK) sequence;
   rotating, by the UE transmitter, successive samples of the at least one sequence from a plurality of sequences by 90 degrees to produce at least one rotated sequence;
   transforming, by the UE transmitter, the at least one rotated sequence into frequency domain using a Discrete Fourier Transform (DFT) to generate a transformed sequence;
   mapping, by the UE transmitter, the transformed sequence using a plurality of subcarriers to generate a mapped transformed sequence; and
   processing, by UE transmitter, the mapped transformed sequence to generate a waveform having an optimized PAPR, optimized auto and cross-correlation.

2. The method as claimed in claim 1, wherein each of the plurality of sequences is a demodulation reference sequence (DMRS).

3. The method as claimed in claim 1, wherein the plurality of sequences has optimized auto, cross correlation and spectrum flatness.

4. The method as claimed in claim 1, wherein:
   for the sequence of length 12, the selected at least one sequence is one of:
      000001001001,
      001001000001, and
      000001101110;
   for the sequence of length 18, the selected at least one sequence is one of:
      010011011000000010,
      001001111000001100,
      000000010010011011, and
      000001100001001111; and
   for the sequence of length 24, the selected at least one sequence is one of:
      000000000111100010110001,
      100010110001000000000111, and
      000000111011000110001010.

5. The method as claimed in claim 1, wherein the method comprises oversampling, by the UE transmitter, the transformed sequence by a factor of P to generate an oversampled transformed sequence, said oversampled transformed sequence has P zeros between any two consecutive samples of the transformed sequence, said P is an integer, and wherein the mapping is performed according to the oversampled transformed sequence.

6. The method as claimed in claim 1, wherein the method comprises an optional precoding of the at least one rotated sequence using a precoder to produce a precoded sequence which is transformed into frequency domain using a DFT operation to generate a transformed sequence.

7. The method as claimed in claim 6, wherein the precoder is of one of a 1+D precoder and a 1−D precoder, wherein D is a delay unit.

8. The method as claimed in claim 1, wherein the method comprises an optional filtering of using a filter to produce a filtered sequence prior to the mapping.

9. The method as claimed in claim 8, wherein the filter is a DFT of one of a 1+D precoder and a 1−D precoder, wherein D is a delay unit.

10. The method as claimed in claim 8, wherein the filtered sequence is mapped to a plurality of subcarriers using a mapping unit to generate a mapped filtered sequence, said mapped filtered sequence is processed using Inverse Discrete Fourier Transform (IDFT) by the UE transmitter to generate a waveform.

11. The method as claimed in claim 1, wherein processing to generate a waveform comprises performing Inverse Discrete Fourier Transform (IDFT) on the mapped sequence to generate a waveform in time domain.

12. A user equipment (UE) transmitter for generating a waveform in a communication network, the UE comprising:
   a processor; and
   a memory communicatively coupled with the processor, wherein the processor is configured to:

select at least one sequence from a plurality of sequences based on an indication by a base station (BS) to a user equipment (UE), wherein:
said plurality of sequences comprises a plurality of sub-sets of sequences such that a sequence in a sub-set of sequences is a cyclic shifted version of another sequence in the said sub-set of sequences, and
each of the plurality of sequences is a Binary Phase Shift Keying (BPSK) sequence;
rotate successive samples of the at least one sequence from a plurality of sequences by 90 degrees to produce at least one rotated sequence;
transform the at least one rotated sequence into frequency domain using a Discrete Fourier Transform (DFT) to generate a transformed sequence;
map the transformed sequence using a plurality of sub-carriers to generate a mapped transformed sequence; and
process the mapped transformed sequence to generate a waveform having an optimized PAPR, optimized auto and cross-correlation.

13. The UE transmitter as claimed in claim 12, wherein each of the plurality of sequences generated is a demodulation reference sequence (DMRS).

14. The UE transmitter as claimed in claim 12, wherein the plurality of sequences has optimized auto-correlation, cross correlation and spectrum flatness.

15. The UE transmitter as claimed in claim 12, wherein the transmitter comprises an optional precoder for precoding the at least one rotated sequence to produce a precoded sequence.

16. The UE transmitter as claimed in claim 15, wherein the precoder is of one of a 1+D precoder and a 1−D precoder, wherein D is a delay unit.

17. The UE transmitter as claimed in claim 12, wherein the transmitter comprises an optional filter for filtering the transformed sequence to produce a filtered sequence.

18. The UE transmitter as claimed in claim 17, wherein the filter is a DFT of one of a 1+D precoder and a 1−D precoder, wherein D is a delay unit.

19. The method as claimed in claim 17, wherein the filtered sequence is mapped to a plurality of subcarriers using a mapping unit to generate a mapped filtered sequence, said mapped filtered sequence is processed to generate a waveform.

20. The UE transmitter as claimed in claim 12, wherein the transmitter comprises an Inverse Discrete Fourier Transform (IDFT) to process the mapped transformed sequence to generate a waveform in time domain.

\* \* \* \* \*